(12) United States Patent
Panicacci

(10) Patent No.: US 7,514,716 B2
(45) Date of Patent: Apr. 7, 2009

(54) IN-PIXEL ANALOG MEMORY WITH NON-DESTRUCTIVE READ SENSE CIRCUIT FOR HIGH DYNAMIC RANGE GLOBAL SHUTTER PIXEL OPERATION

(75) Inventor: Roger Panicacci, San Clemente, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 154 days.

(21) Appl. No.: 11/511,208

(22) Filed: Aug. 29, 2006

(65) Prior Publication Data

US 2008/0074523 A1    Mar. 27, 2008

(51) Int. Cl.
*H01L 27/14* (2006.01)

(52) U.S. Cl. .................................. 257/72; 257/E31.097

(58) Field of Classification Search ................. 348/308; 257/72, 222, 225, 234, E31.097
See application file for complete search history.

(56) References Cited

U.S. PATENT DOCUMENTS

| | | | | |
|---|---|---|---|---|
| 5,146,302 | A | * | 9/1992 | Kumada ..................... 257/225 |
| 5,612,799 | A | * | 3/1997 | Yamazaki et al. ............. 349/42 |
| 5,659,315 | A | * | 8/1997 | Mandl ........................ 341/143 |
| 6,088,058 | A | * | 7/2000 | Mead et al. ................. 348/296 |
| 6,115,065 | A | * | 9/2000 | Yadid-Pecht et al. ........ 348/308 |
| 6,140,630 | A | | 10/2000 | Rhodes |
| 6,204,524 | B1 | | 3/2001 | Rhodes |
| 6,310,366 | B1 | | 10/2001 | Rhodes |
| 6,326,652 | B1 | | 12/2001 | Rhodes |
| 6,333,205 | B1 | | 12/2001 | Rhodes |
| 6,376,868 | B1 | | 4/2002 | Rhodes |
| 6,504,141 | B1 | * | 1/2003 | Kozlowski et al. ...... 250/214 A |
| 6,570,617 | B2 | * | 5/2003 | Fossum et al. .............. 348/308 |
| 6,639,261 | B2 | * | 10/2003 | Rhodes ........................ 257/291 |
| 6,740,915 | B1 | * | 5/2004 | Rhodes ........................ 257/291 |
| 2002/0113886 | A1 | | 8/2002 | Hynecek |
| 2004/0217398 | A1 | * | 11/2004 | Lee ............................. 257/292 |
| 2005/0274994 | A1 | * | 12/2005 | Rhodes ........................ 257/291 |

FOREIGN PATENT DOCUMENTS

| EP | 0 675 345 A2 | 10/1995 |
|---|---|---|
| EP | 0675 345 A3 | 10/1995 |

* cited by examiner

*Primary Examiner*—Marcos D Pizarro
*Assistant Examiner*—Bilkis Jahan
(74) *Attorney, Agent, or Firm*—Dickstein Shapiro LLP

(57) ABSTRACT

An imaging device having pixels that store charge from a photosensor under at least one storage gate during a sampling period. A driver used to operate the at least one storage gate, senses how much charge was transferred to the storage gate and sets a flag in an analog memory (e.g., stores a voltage in a floating diffusion region) based on the amount of sensed charge. The sensed charge is used to determine an integration time for the pixel.

18 Claims, 18 Drawing Sheets

| EVENT ORDER IN TIME | SG SENSE SAMPLING POINT | SG COMPARATOR THRESHOLD Vsg_ref AND % OF MAX PIXEL CAPACITY (FULL WELL) | INTEGRATION TIME INDEX FLAG CODE (IF SG_sense > Vsg_ref) | INTEGRATION TIME INDEX FLAG VOLTAGE (SET ON FD) | INTEGRATION TIME SHUTTER POINTER ASSIGNMENT (USED TO SET PIXEL INTEGRATION TIME) |
|---|---|---|---|---|---|
| 1. | SG_Pointer1 | 0.8V (80% FW) | "11" | 1.0V | Sh_pointer3 (SHORTEST) |
| 2. | SG_Pointer1 | 0.6V (60% FW) | "10" | 1.5V | Sh_pointer2 |
| 3. | SG_Pointer1 | 0.3V (30% FW) | "01" | 2.0V | Sh_pointer1 |
| 4. | | USED IF SG_sense < 0.3V | "00" | 2.5V | Sh_pointer0 (LONGEST) |

FIG. 7

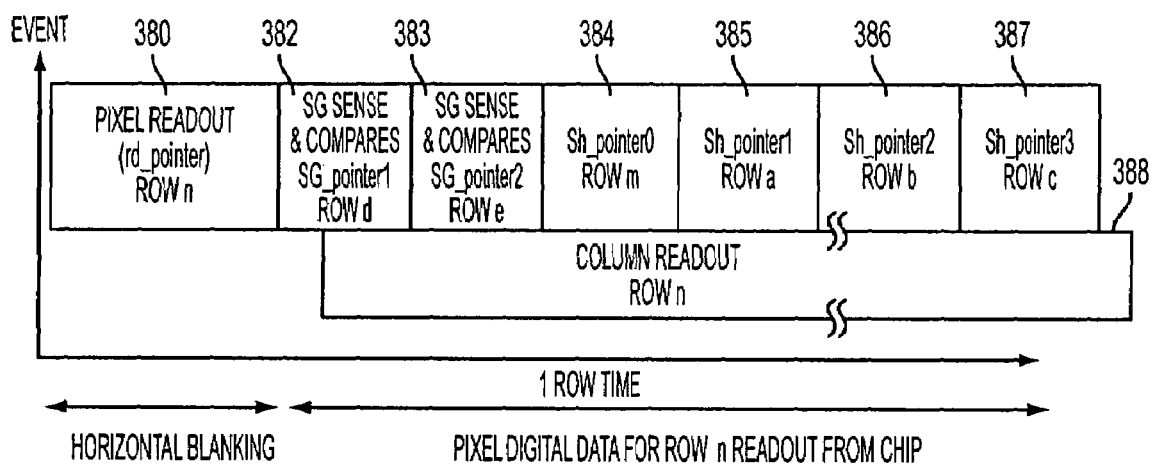

FIG. 8

| EVENT ORDER IN TIME | SG SENSE SAMPLING POINT | SG COMPARATOR THRESHOLD Vsg_ref AND % OF MAX PIXEL CAPACITY (FULL WELL) | INTEGRATION TIME INDEX FLAG CODE (IF SG_sense > Vsg_ref) | INTEGRATION TIME INDEX FLAG VOLTAGE (SET ON FD) | INTEGRATION TIME SHUTTER POINTER ASSIGNMENT (USED TO SET PIXEL INTEGRATION TIME) |
|---|---|---|---|---|---|
| 1. | SG_Pointer1 | 0.8V (80% FW) | "11" | 1.0V | Sh_pointer3 (SHORTEST) |
| 2. | SG_Pointer2 | 0.75V (75% FW) | "10" | 1.5V | Sh_pointer2 |
| 3. | SG_Pointer2 | 0.4V (40% FW) | "01" | 2.0V | Sh_pointer1 |
| 4. | | USED IF SG_sense < 0.4V | "00" | 2.5V | Sh_pointer0 (LONGEST) |

FIG. 9

IN-PIXEL ANALOG MEMORY WITH NON-DESTRUCTIVE READ SENSE CIRCUIT FOR HIGH DYNAMIC RANGE GLOBAL SHUTTER PIXEL OPERATION

FIELD OF THE INVENTION

Embodiments of the invention relate generally to imaging devices and more particularly to methods and apparatuses for achieving high dynamic range in imaging devices.

BACKGROUND

A CMOS imager circuit includes a focal plane array of pixel cells, each one of the cells including a photosensor, for example, a photogate, photoconductor or a photodiode overlying a substrate for accumulating photo-generated charge in the underlying portion of the substrate. Each pixel cell has a readout circuit that includes at least an output field effect transistor formed in the substrate and a charge storage region formed on the substrate connected to the gate of an output transistor. The charge storage region may be constructed as a floating diffusion region. Each pixel may include at least one electronic device such as a transistor for transferring charge from the photosensor to the storage region and one device, also typically a transistor, for resetting the storage region to a predetermined charge level prior to charge transference.

In a CMOS imager, the active elements of a pixel cell perform the necessary functions of: (1) photon to charge conversion; (2) accumulation of image charge; (3) resetting the storage region to a known state before the transfer of charge to it; (4) transfer of charge to the storage region; (5) selection of a pixel for readout; and (6) output and amplification of a signal representing pixel charge. Photo charge may be amplified when it moves from the initial charge accumulation region to the storage region. The charge at the storage region is typically converted to a pixel output voltage by a source follower output transistor.

CMOS imagers of the type discussed above are generally known as discussed, for example, in U.S. Pat. Nos. 6,140,630, 6,376,868, 6,310,366, 6,326,652, 6,204,524 and 6,333,205, assigned to Micron Technology, Inc., which are hereby incorporated by reference in their entirety.

FIG. 1 illustrates a CMOS imager 100 having a pixel array 102 connected to column sample and hold (S/H) circuitry 136. The pixel array 102 comprises a plurality of pixels 110 arranged in a predetermined number of rows and columns. The illustrated pixel 110 contains a pinned photodiode photosensor 112, transfer gate 114, a floating diffusion region FD to collect charge transferred from the photosensor 112, a reset transistor 116, row select transistor 120 and a source follower output transistor 118. The pixel 110 also includes a storage gate 124 for storing charge from the photosensor 112 in a channel region 124b when a storage gate control signal SG is applied to a storage gate control line 124a. FIG. 1 also shows an anti-blooming gate 125, which may be used to drain away excess charge from the photosensor 112 to region 127 when an anti-blooming control signal AB is applied to the anti-blooming gate 125. Without the anti-blooming gate 125, the pixel 110 is a five transistor (5T) pixel. If the anti-blooming gate 125 is used, the pixel 110 is a six transistor (6T) pixel.

The reset transistor 116 is connected between the floating diffusion region FD and an array pixel supply voltage Vaa-pix. A reset control signal RST is used to activate the reset transistor 116, which resets the floating diffusion region FD to the array pixel supply voltage Vaa-pix level as is known in the art. The source follower transistor 118 has its gate connected to the floating diffusion region FD and is connected between the array pixel supply voltage Vaa-pix and the row select transistor 120. The source follower transistor 118 converts the charge stored at the floating diffusion region FD into an electrical output voltage signal Vout. The row select transistor 120 is controllable by a row select signal SEL for selectively connecting the source follower transistor 118 and its output voltage signal Vout to a column line 122 of the pixel array 102.

In operation, the pixels 110 of each row in the array 102 are all turned on at the same time by a row select line e.g., SEL(0) and the pixels 110 of each column are selectively output onto a column line 122. A plurality of row and column lines are provided for the entire array 102. The row lines e.g., SEL(0) are selectively activated by row decoder 130 and driver circuitry 132 in response to an applied row address. Column select lines (not shown) are selectively activated in response to an applied column address by column circuitry that includes column decoder 134. Thus, row and column addresses are provided for each pixel 110. The CMOS imager 100 is operated by a sensor control and image processing circuit 150, which controls the row and column circuitry for selecting the appropriate row and column lines for pixel readout.

Each column is connected to sampling capacitors and switches in the S/H circuitry 136. A pixel reset signal Vrst and a pixel image signal Vsig for selected pixels are sampled and held by the S/H circuitry 136. A differential signal (Vrst-Vsig) is produced for each readout pixel by the differential amplifier 138 (AMP), which applies a gain to the signal received from the S/H circuitry 136. The differential signal is digitized by an analog-to-digital converter 140 (ADC). The analog-to-digital converter 140 supplies the digitized pixel signals to the sensor control and image processing circuit 150, which among other things, forms a digital image output. The imager also contains biasing/voltage reference circuitry 144.

The FIG. 1 imager 100 has a pixel configuration that uses a storage gate 124 and anti-blooming gate 125 to achieve a global shutter operation (as opposed to a rolling shutter). Typically, the TX, RST, SG, and SEL control signals are driven horizontally from the row driver 132 (respectively shown as TX(0), RST(0), SG(0) and SEL(0) to indicate signals for row number 0 in the array 102) while the pixel power (e.g., Vaa-pix) and output Vout are routed vertically to the column circuitry 136.

There exists a need and desire for an improved technique for achieving high dynamic range image outputs from the conventional imager 100.

BRIEF DESCRIPTION OF THE DRAWINGS

FIG. 7 is a table illustrating the FIG. 6 operation.
FIG. 8 is a timing diagram of another operation of the FIG. 2 imager according to an embodiment of the invention.
FIG. 9 is a table illustrating the FIG. 8 operation.

DETAILED DESCRIPTION

Figure 1:
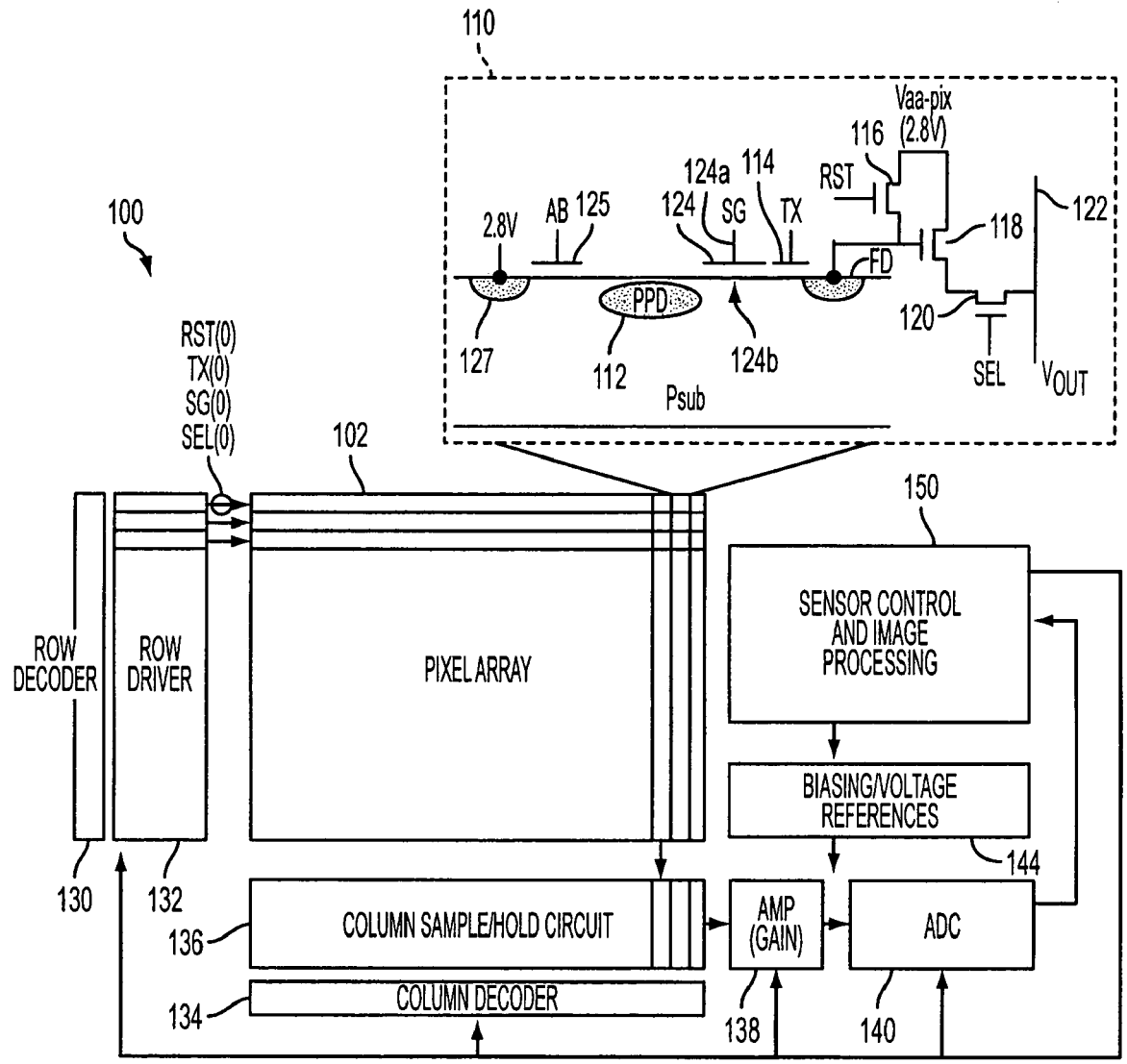
FIG. 1 illustrates a CMOS imager.

In the following detailed description, reference is made to the accompanying drawings, which are a part of the specification, and in which is shown by way of illustration various embodiments whereby the invention may be practiced. These embodiments are described in sufficient detail to enable those skilled in the art to make and use the invention. It is to be understood that other embodiments may be utilized, and that structural, logical, and electrical changes, as well as changes in the materials used, may be made without departing from the spirit and scope of the present invention.

The term "pixel" refers to a photo-element unit cell containing a photo-conversion device or photosensor and transistors for processing an electrical signal from electromagnetic radiation sensed by the photo-conversion device. The pixels discussed herein are illustrated and described as inventive modifications to five transistor (5T) pixel circuits for the sake of example only. It should be understood that embodiments of the invention are not limited to a five transistor (5T) pixel, but may be used with other pixel arrangements having fewer (e.g., 3T, 4T) or more (e.g., 6T) than five transistors. Although embodiments of the invention are described herein with reference to the architecture and fabrication of one pixel, it should be understood that this is representative of a plurality of pixels in an array of an imager device. In addition, although embodiments of the invention are described below with reference to a CMOS imager, the embodiments have applicability to any solid state imaging device having pixels. The following detailed description is, therefore, not to be taken in a limiting sense, and the scope of the embodiments of the invention is defined only by the appended claims.

Currently, there are many techniques designed to achieve high dynamic range image outputs. These techniques rely on pixels that have variable response to adapt to higher illumination levels (i.e., linear response at lower illumination levels and logarithmic response at higher illumination), or variable bias conditions to remove a percentage of any accumulated charge at higher illumination levels; other techniques use variable exposure times. Pixels that use variable response circuit techniques like logarithmic pixels or that use variable bias conditions to spill off excess charge typically suffer from pixel-to-pixel response variation; this occurs due to the difficulty in achieving high precision transistor device matching.

Proposed methods that use variable exposure time must tradeoff spatial resolution for rows of pixels with different exposure times, which is undesirable. In addition, there are other techniques that add multiple transistors to the pixel circuits. The addition of multiple transistors to the already "fill factor" sensitive pixels is undesirable and does not allow for small-sized pixels. To date, all of the above mechanisms are undesirable.

Embodiments of the invention provide an imager with high dynamic range by selecting between multiple exposure times on a per pixel basis based on non-destructive pixel read operations. The embodiments work with rolling shutter and global shutter style readouts. It is expected that as more applications require high dynamic range images or as pixel full well capacity shrinks that the embodiments will enable image capture beyond the response range of a pixel's typical linear response.

By modifying a typical 5T global shutter pixel to include an extra transfer gate between the photosensor and storage gate and modifying how the storage gate is controlled, estimates of pixel illumination through a non-destructive pixel read operation are obtained. Using the illumination information and subsequently storing the information as a specific voltage on the pixel's floating diffusion region, different integration times may be applied to each pixel.

In another embodiment, a method is applied to an unmodified 5T global shutter pixel (i.e., pixel 110 of FIG. 1). In that embodiment, the transfer gate is used to detect the pixel signal and to set the pixel's integration time. These embodiments allow the setting of one of multiple integration times to any pixel in the array; in these embodiments, the pixel array is readout using the rolling shutter technique with multiple shutter pointers used to control the integration time.

By modifying the pixel to include an anti-blooming gate to reset the pixel and controlling this gate with a connection within the pixel that is controlled by the voltage on the floating diffusion region, high dynamic range global shutter operation may be achieved. As is explained below in more detail, in another embodiment, adding a capacitor to the pixel enables at least three separate integration times. Both of these methods are minor modifications to a 6T global shutter pixel that includes the anti-blooming gate and hence, they do not significantly adversely impact pixel fill factor.

Figure 2:
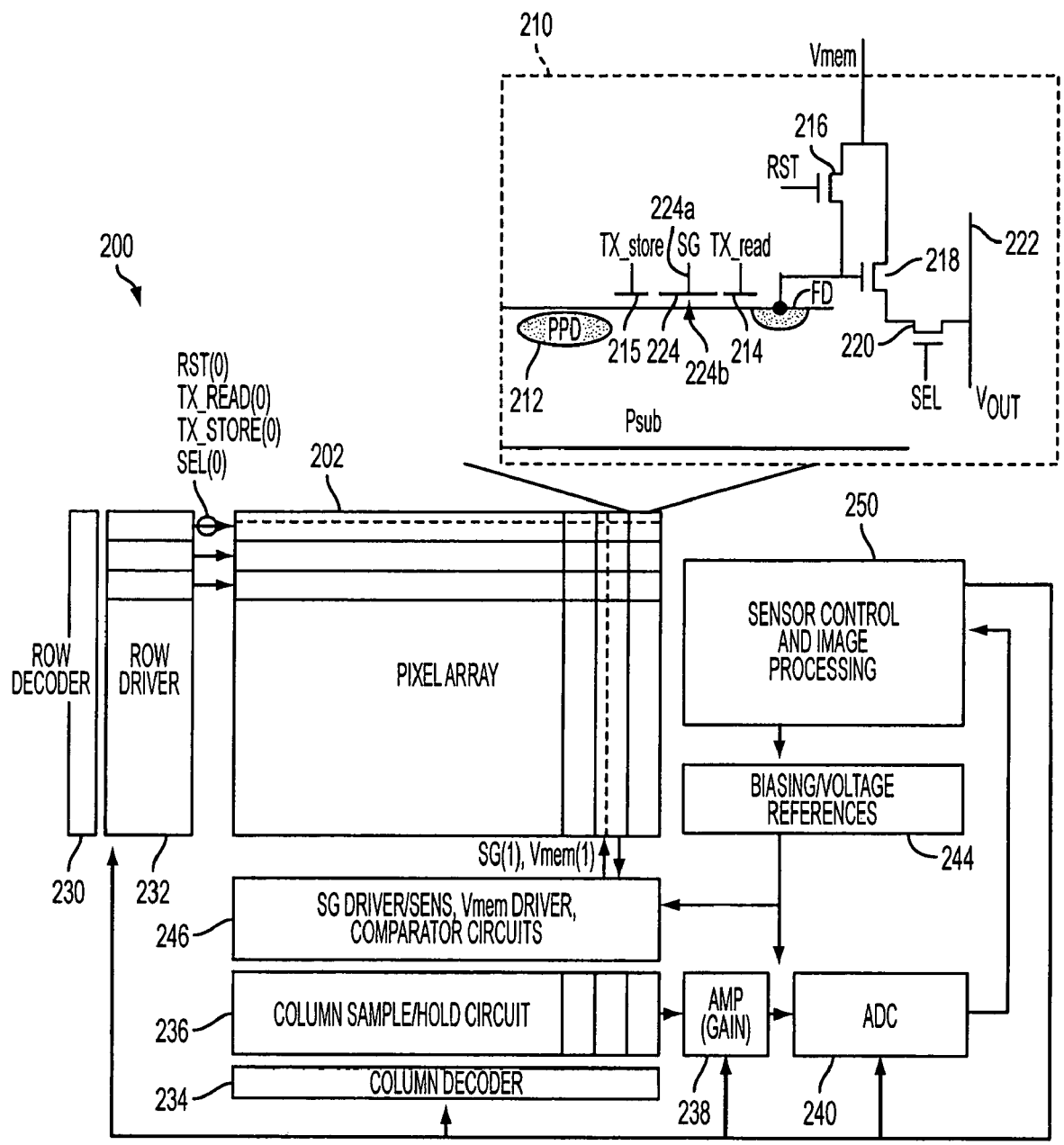
FIG. 2 illustrates a CMOS imager constructed in accordance with an embodiment of the invention.

FIG. 2 illustrates a CMOS imager 200 constructed in accordance with an embodiment of the invention. The illustrated imager 200 includes a pixel array 202 comprising a plurality of pixels 210 arranged in a predetermined number of rows and columns. The outputs Vout of each pixel 210 are connected to column output lines 222, which are connected to column circuitry that includes sensing, driver and comparator circuit 246 and column sample and hold (S/H) circuit 236.

The illustrated pixel 210 contains a pinned photodiode photosensor 212, read transfer gate 214, storage transfer gate 215, and a floating diffusion region FD to collect charge transferred from the photosensor 212. Each pixel 210 also includes a reset transistor 216, row select transistor 220 and a source follower output transistor 218. The pixel 210 further includes a storage gate 224 for storing charge in a channel region 224b from the photosensor 212 when a storage gate control signal SG is applied to a storage gate control line 224a.

The reset transistor 216 is connected between the floating diffusion region FD and a memory voltage Vmem (described in more detail below) received from the sensing, driver and comparator circuit 246. A reset control signal RST is used to activate the reset transistor 216, which places the memory voltage Vmem on the floating diffusion region FD (described in more detail below). The source follower transistor 218 has its gate connected to the floating diffusion region FD and is connected between the memory voltage Vmem and the row select transistor 220. The source follower transistor 218 converts the charge stored at the floating diffusion region FD into the electrical output voltage signal Vout. The row select transistor 220 is controllable by a row select signal SEL for selectively connecting the source follower transistor 218 and its output voltage signal Vout to the column line 222.

Row lines e.g., SEL(0) connected to the array 202 are selectively activated by row decoder 230 and row driver circuitry 232 in response to an applied row address. Column select lines are selectively activated in response to an applied column address by column circuitry including a column decoder 234. It should be noted that in the figures, RST(0), TX_read(0), TX_store(0), SEL(0) indicate RST, TX_read, TX_store and SEL signals for a particular row (e.g., row 0). Likewise, SG(1), Vmem(1) are used to indicate SG and Vmem signals for a particular column (e.g., column 1).

The CMOS imager 200 is operated by a sensor control and image processing circuit 250, which controls the row and column circuitry for selecting the appropriate row and column lines for pixel readout. Each column is connected to sampling capacitors and switches in S/H circuitry 236. A pixel reset signal Vrst and a pixel image signal Vsig for selected pixels are sample and held by the S/H circuitry 236. A differential signal (Vrst-Vsig) is produced for each pixel by the differential amplifier 238, which applies a gain to the signal received from the S/H circuitry 236. The differential signal is digitized by an analog-to-digital converter 240 (ADC). The analog-to-digital converter 240 supplies the digitized pixel signals to the sensor control and image processing circuit 250, which among other things, forms a digital image output. The imager 200 also contains biasing/voltage reference circuitry 244.

Imager 200 is different than the FIG. 1 imager 100 in the following ways. In the illustrated embodiment, an additional transfer gate (i.e., storage transfer gate 215) is added to each pixel 210 in the array 202. The extra transfer gate 215 enables a charge transfer from the photosensor 212 to the storage gate 224 in response to a TX_store control signal. The other transfer gate 214 enables a charge transfer from the storage gate 224 to the floating diffusion region FD in response to a TX_read control signal. Another difference is that the storage gate 224 is routed in the vertical direction to the column circuits (e.g., circuit 246, 236). The sensing, driver and comparator circuit 246 contains a driver to control the storage gate 224 and also has a mode to sense a change in stored charge under the storage gate 224. The transfer gate control signals TX_store, TX_read, however, are routed in the horizontal direction.

In operation, a row of pixels is sampled after a predetermined sampling exposure time has elapsed. The sampling operation is used to determine the approximate light level at each pixel 210. This sampling process is non-destructive and may typically occur in between normal row readout operations, where the final pixel signal is readout at the end of an exposure period. In addition, multiple sampling operations may be used to determine the exposure time for highly illuminated pixels while also avoiding saturation of the pixels. To perform the non-destructive read, the storage gate 224 is activated (via the SG control signal) by the sensing, driver and comparator circuit 246 that is shared by all pixels 210 in that column. After the storage gate 224 is activated, but before charge is transferred under it, a charge sensing circuit (described below in more detail) within the sensing, driver and comparator circuit 246 is enabled. Then, the TX_store control signal is set high to activate the storage transfer gate 215, which enables a transfer of charge from the photosensor (PPD) to the channel underneath the storage gate 224 (see FIG. 3). The charge sensing circuit within the column sensing, driver and comparator circuit 246 senses the transferred charge and generates outputs proportional to the transferred charge. The transferred charge is eventually pushed back to the photosensor 212 (preferably after the sensing operation and processing described below) by deactivating the storage gate 224.

A comparator circuit within the column sensing, driver and comparator circuit 246 is attached to the output of the sensing circuit and is used to roughly determine how much charge was collected by the pixel 210 at the sampling point (i.e., the amount of charge under the storage gate 224). A threshold reference voltage connected to the comparator circuit is used to estimate whether the pixel 210 should integrate for the maximum available integration time or for one of several periods less than the maximum period. As is discussed below in more detail, the possible integration times are controlled by two or more shutter pointers that are initialized when selected pixels in a row should start their respective charge integration periods.

Typically, in existing products, the shutter pointer is applied to an entire row of pixels. In the illustrated embodiment of the invention, however, by having the storage gate 224 routed in the vertical direction to the column circuits 246, 236, individual pixels 210 in a selected row can be reset at different times from other pixels in the row. In the invention, during the non-destructive pixel "sense" operation used to determine the pixel's current light exposure, a voltage (Vmem) is written to the pixel's 210 floating diffusion region FD to identify which shutter pointer to use to reset the pixel 210. Essentially, the memory voltage Vmem is used as a voltage flag (i.e., different voltage have different meanings as is discussed below in more detail). The voltage flag (i.e., Vmem) is written to the pixel 210 by applying a high reset control signal RST for the row containing the pixel 210 and setting the memory voltage Vmem to the appropriate voltage value for the chosen shutter pointer for that pixel (described below in more detail).

Then, when the desired exposure time has elapsed and the shutter pointer logic activates the transfer gates 214, 215 for the particular row, the storage gate 224 is activated only if the voltage flag matches the current shutter pointer. During the row's reset operation, the floating diffusion region's FD voltage is re-written with the voltage flag (Vmem), which is read during the pixel readout operation at the end of the exposure period. The transfer gates 214, 215 and the storage gate 224 are also activated during readout and photosensor reset operations to make sure all charge is transferred (during readout) and the photosensor 212 is properly reset (during reset). The memory voltage Vmem is set to a predetermined readout level (e.g., 2.8V) during the normal pixel readout operation.

Figure 4:
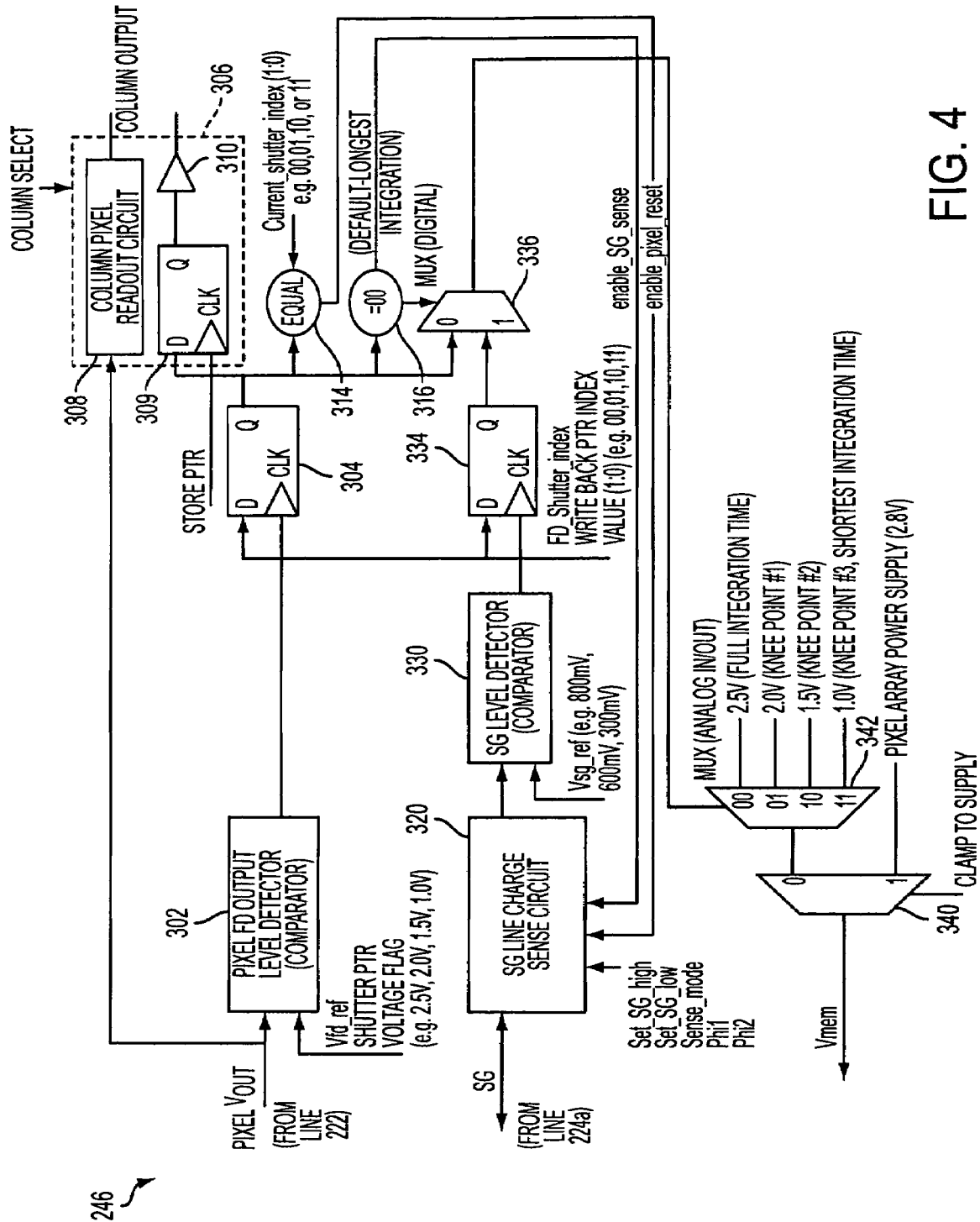
FIG. 4 illustrates one example of a column circuit used in the FIG. 2 imager.

FIG. 4 illustrates one example of a column sensing, driver and comparator circuit 246 used in the FIG. 2 imager 200. The circuit 246 includes a pixel FD output level detector 302, which may be implemented as a comparator, a first latch 304, column output circuit 306, an SG line charging and sensing circuit 320, an SG level detector 330, which may also be implemented as a comparator, a second latch 334, three multiplexers 336, 340, 342 and two logic evaluator components 314, 316. In the illustrated embodiment, the column output circuit 306 includes a pixel readout circuit 308, a third latch 309 and a driver 310.

A brief explanation of the circuit 246 is now provided. Detailed explanations of the different operating methods of the invention are provided below with respect to FIGS. 10-12. The output Vout of a pixel is input into the pixel FD output level detector 302 and the column output circuit 306. The pixel FD output level detector 302 also inputs a reference voltage Vfd_ref, shutter pointer and a voltage flag values (e.g., 2.5V, 2.0V, 1.5V, 1.0V). The flag values could also be stored in logic, registers, etc. within or attached to the detector 302. The pixel FD output level detector 302 determines the value of the floating diffusion voltage flag (i.e., Vmem) based on the pixel output Vout voltage level.

The flag (i.e., Vmem) will be used: (1) during normal pixel readout along with the analog signal levels to enable other circuits to process the pixel data and (2) during the shutter pointer operation for a row to determine if the pixel should be reset. The output of circuit 302 is used to clock latch 304. A digital index value FD_Shutter_index is stepped along with the reference voltage Vfd_ref value to latch (via latch 304) the associated index value once the floating diffusion voltage value (Vfd) is detected by circuit 302. The digital index value FD_Shutter_index is a 2-bit write back pointer having possible binary values of "00", "01", "10" and "11".

The output of the first latch 304 is used as an input into latch 309 within column circuit 306. A store pointer Store_ptr is used to clock latch 309 so that the latch 309 latches and outputs the 2-bit value of the FD_Shutter_index. Driver 310 is used to drive the FD_Shutter_index out of the column output circuit 306. The readout circuit 308 within the column output circuit 306 is part of the column S/H circuitry 236. The output from the driver 310 is a 2-bit digital output. After amplification and analog-to-digital conversion of the analog pixel signal value, the digital value is then multiplied by the ratio of the longest integration time to the actual integration time for that pixel (as indicated by the 2-bit value).

The SG line charging and sensing circuit 320 is connected to the SG line 224a connected to the storage gate 224 (FIG. 2) of the pixel. The SG line charging and sensing circuit 320 inputs an enable_SG_sense, enable_pixel_reset, Set_SG_high, Set_SG_low, Sense_mode signals and complementary clock signals Phi1, Phi2. The SG line charging and sensing circuit 320 contains switches to activate or deactivate the storage gate 224 (FIG. 2) as well as a switched capacitor circuit to sense the charge transferred under the storage gate 224 (shown and described in greater detail below with respect to FIGS. 13 and 14).

The SG line charging and sensing circuit 320 generates a voltage in proportion to the sensed signal. The voltage is passed to SG level detector 330, which also inputs an SG level threshold Vsg_ref which may be set to multiple values (e.g., 800 mV, 600 mV, 300 mV). The output of the detector 330 clocks latch 334, which also inputs the FD_Shutter_index. At the end of the comparison phase, the SG signal is driven low by circuit 320 (in response to the Set_SG_low signal) to push charge back into the photosensor (i.e., by deactivating the storage gate 224).

The output of the first latch 304 is also input into evaluator components 314, 316. The first evaluator component 314 determines if the first latch 304 output is equal to the current shutter index Current_shutter_index, which is a 2-bit index having possible binary values of "00", "01", "10" and "11". If component 314 determines that the first latch 304 output is equal to the current shutter index Current_shutter_index, then the enable_pixel_reset signal is generated and sent to the SG line charging and sensing circuit 320. Otherwise, the enable_pixel_reset signal is not generated.

The second evaluator component 316 determines if the first latch 304 output is equal to "00". The value "00" is used in this example to define the default or longest integration time. If component 316 determines that the first latch 304 output is equal to "00", then the enable_SG_sense signal is generated and sent to the SG line charging and sensing circuit 320. Otherwise, the enable_SG_sense signal is not generated. In addition, the output of component 316 is used to control the first multiplexer 336. The outputs of the first and second latches 304, 334 are input into the first multiplexer 336. The multiplexer 336 will output either the output of latch 304 or latch 334 based on the signal received from evaluator component 316. The multiplexer 336 is used to select either the already written flag value for the floating diffusion (if it is not equal to "00" as is possible in the case explained later for multiple pixel sensing operations) for writing back the flag value to the floating diffusion or to select the output from the SG level detector for floating diffusions not set to a value yet.

The 2-bit output of the first multiplexer 336 controls the output from the second multiplexer 342. If the output from the first multiplexer 336 is "00", then the output from the second multiplexer 342 is a voltage associated with the longest integration time (e.g., 2.5V). If the output from the first multiplexer 336 is "01", then the output from the second multiplexer 342 is a voltage associated with a first knee point integration time, which is shorter than the longest integration time (e.g., 2.0V). If the output from the first multiplexer 336 is "10", then the output from the second multiplexer 342 is a voltage associated with a second knee point integration time, which is shorter than the first knee point integration time (e.g., 1.5V). If the output from the first multiplexer 336 is "11", then the output from the second multiplexer 342 is a voltage associated with a third knee point integration time, which is shorter than the second knee point integration time (e.g., 1.0V).

The output of the second multiplexer 342 is used as an input to the third multiplexer 340. The third multiplexer 340 also inputs the pixel array power supply voltage (e.g., 2.8V). Based on the digital index value FD_Shutter_index, a memory voltage Vmem indicative of the pixel's present illumination is written to the floating diffusion region FD in the pixel through the reset transistor (as described above).

Figure 5:
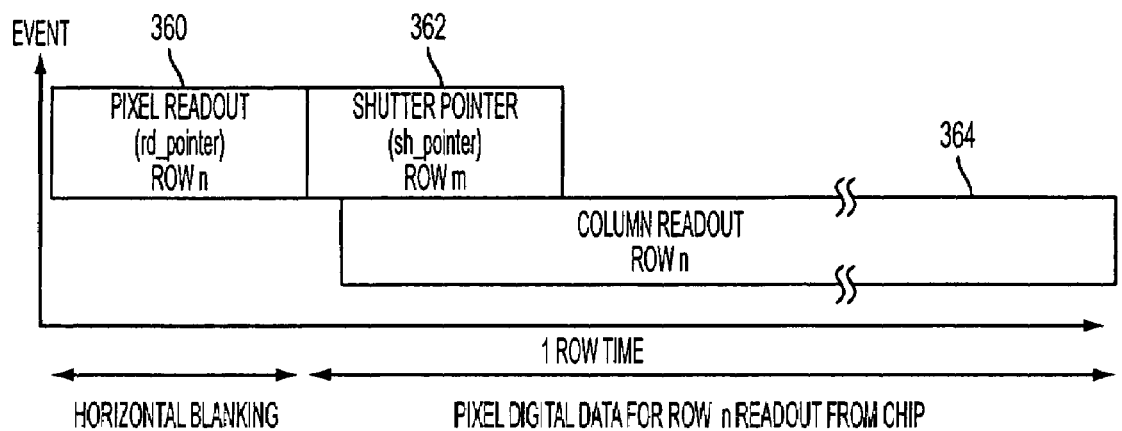
FIG. 5 is a timing diagram of an operation of a conventional imager.

FIG. 5 is a timing diagram of an operation of a conventional imager, such as the imager 100 illustrated in FIG. 1. The diagram illustrate a horizontal blanking period and a readout period for ROW n. Typically, exposure time is defined in terms of the number of row times between initializing a pixel for integration (i.e., resetting the pixel) and reading the pixel value into the column circuits. The digital control logic of the imager keeps track of the row address of the pixels to be readout with a digital read pointer (rd_pointer). The same control logic keeps track of the row address of the pixels to be initialized with a shutter pointer (sh_pointer). In the conventional imager operation, a row (ROW n) of pixels is first read into the column sample and hold circuitry at the and of an integration period (block 360). After that time, the shutter pointer sets the starting point for pixel integration for all pixels in another row (ROW m) (block 362) while a column readout of the pixels from the row read into the column sample and hold circuitry (i.e., ROW n, using the read pointer rd_pointer) begins (block 364).

Figure 6:
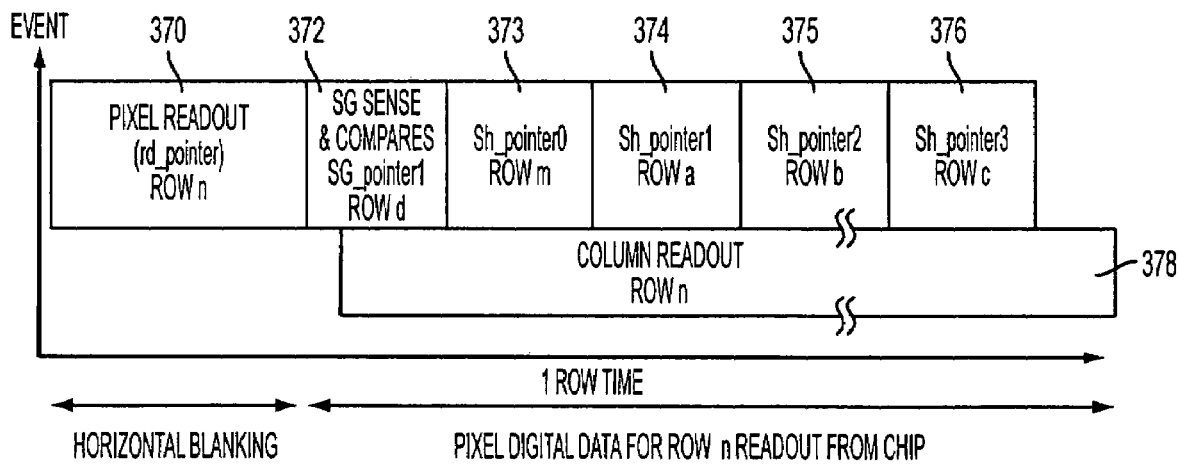
FIG. 6 is a timing diagram of an operation of the FIG. 2 imager according to an embodiment of the invention.

FIG. 6 is a timing diagram of an operation of the FIG. 2 imager 200 according to an embodiment of the invention. Similar to the conventional operation illustrated in FIG. 5, a row (ROW n) of pixels is read into the column sample and hold circuits using the read pointer rd_pointer (block 370). Unlike the conventional operation, this read operation is followed by a sense operation for another row (ROW d) in the array that is addressed by a storage gate pointer SG_pointer1 (block 372). Pixels in that row (ROW d) may have an integration time set by the last time they were readout and allowed to start integration or they may have started integration after the first shutter pointer initialized them. This time is variable because it depends on how much light is in the scene and the minimum signal needed to make an accurate signal estimate during the sense operation. After the sense operation, the other shutter pointers Sh_pointer0, Sh_pointer1, Sh_pointer2, Sh_pointer3 perform their initialization operations on various rows ROWs m, a, b, c in the array (blocks 374-376). Each of shutter pointers Sh_pointer0, Sh_pointer1, Sh_pointer2, Sh_pointer3 represent different integration times. For example, for a short integration time (block 376) the shutter operation happens within a few row times of the read pointer rd_pointer operation for that row, whereas for long integration times the time between the shutter pointer and read pointer operation for the row is longer.

FIG. 7 is a table illustrating the FIG. 6 operation of the invention. The table illustrates examples of the SG comparator threshold voltage Vsg_ref, resulting indexes as well as the voltage flag for setting the shutter pointer shown in FIG. 4. In the illustrated example, the longest exposure time (Sh_pointer0) is flagged with the highest voltage value (2.5V) on the floating diffusion region. In the illustrated example, the shortest integration time (Sh_pointer3) is flagged with the smallest voltage value (1.0V).

Embodiments of the invention include the option to perform multiple sense operations at different times to maximize the available signal for the storage gate sense operation. Multiple sense operations will provide more accurate estimations for the best integration time to use. FIG. 8 is a timing diagram illustrating the operation of the FIG. 2 imager 200 using multiple sense operations according to an embodiment of the invention. FIG. 9 is the corresponding table for the operations illustrated in FIG. 8. FIG. 9 also illustrates how thresholds are set up for the additional sense operations.

Similar to the conventional operation illustrated in FIG. 5, a row (ROW n) of pixels is read into the column sample and hold circuits using the read pointer rd_pointer (block 380). Unlike the conventional operation, this read operation is followed by a sense operation for another row (ROW d) in the array that is addressed by a storage gate pointer SG_pointer1 (block 382). Pixels in that row (ROW d) may have an integration time set by the last time they were readout and allowed to start integration or they may have started integration after the first shutter pointer initialized them. This time is variable because it depends on how much light is in the scene and the minimum signal needed to make an accurate signal estimate during the sense operation. After the sense operation, another sense operation is performed on a different row (ROW e) addressed by a second storage gate pointer SG_pointer2 (block 383).

The other shutter pointers Sh_pointer0, Sh_pointer1, Sh_pointer2, Sh_pointer3 perform their initialization operations on various rows ROWs m, a, b, c in the array (blocks 384-387). Each of shutter pointers Sh_pointer0, Sh_pointer1, Sh_pointer2, Sh_pointer3 represent different integration times. For example, for a short integration time (block 387) the shutter operation happens within a few row times of the read pointer rd_pointer operation for that row whereas for long integration times the time between the shutter pointer and read pointer operation for the row is longer. In the multiple sensing mode, if the first sense operation didn't set an exposure level other than the longest, the pixel is re-evaluated at a the second sense operation.

Figure 3:
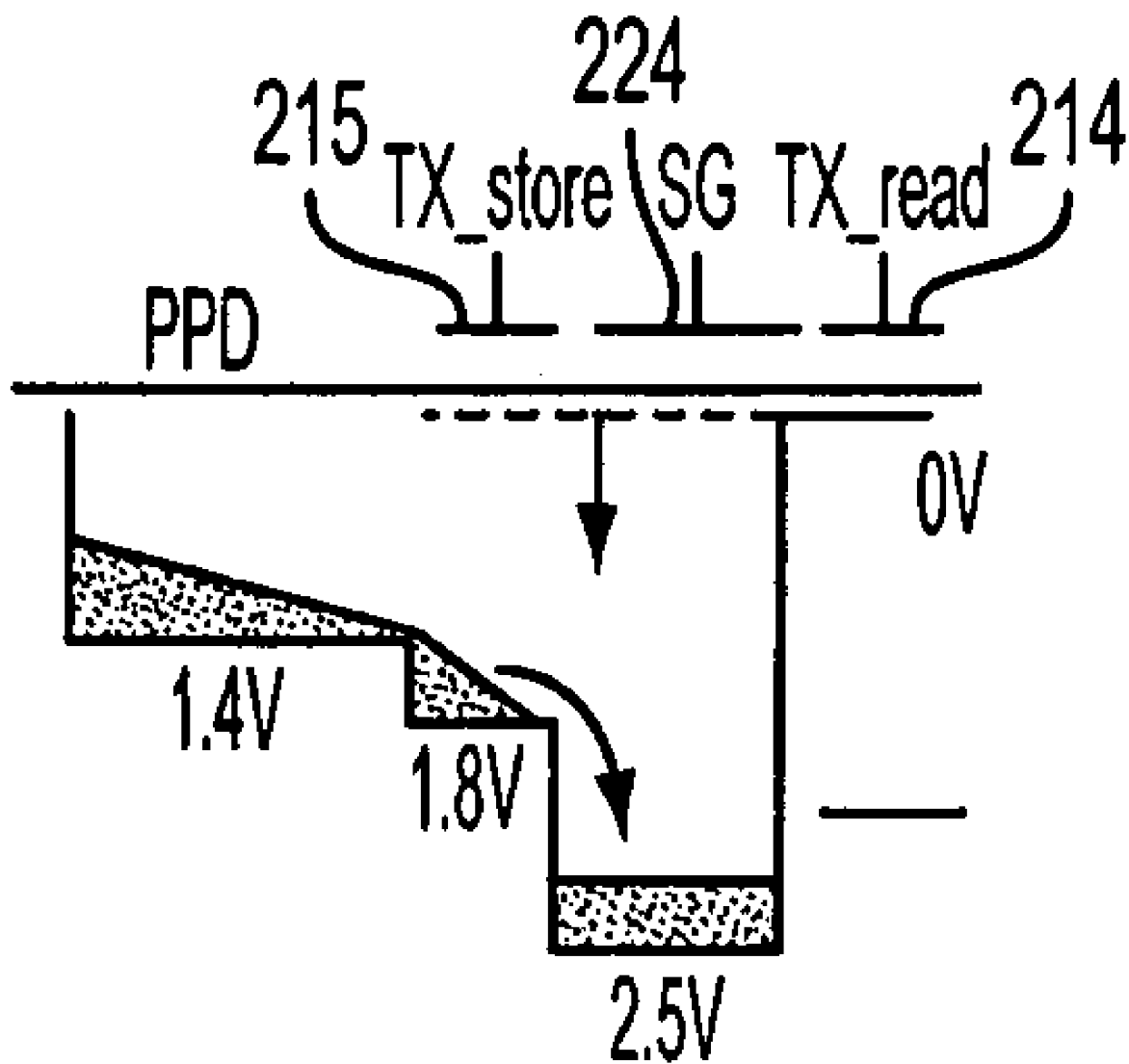
FIG. 3 illustrates a potential diagram for an operation of the FIG. 2 imager.
Figure 10:
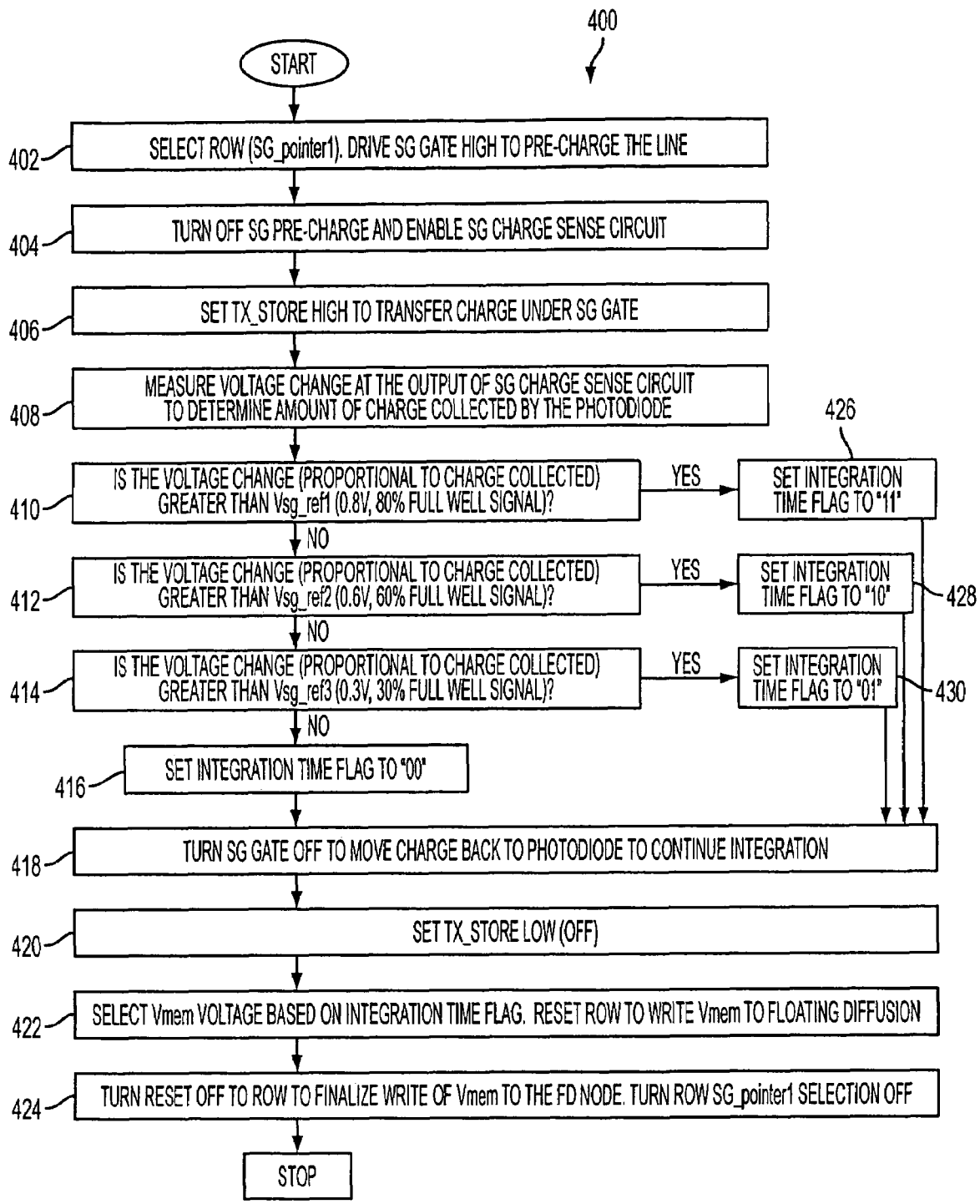
FIG. 10 is a flowchart illustrating a storage gate sense operation.

FIG. 10 is a flowchart illustrating a method 400 comprising the processing performed during a storage gate sense operation. Referring to FIGS. 2, 3 and 10, at step 402, a row is selected (via SG_pointer1). Once selected, the storage gate 224 is activated (i.e., driven high) to pre-charge the SG line. At step 404, once the SG line is precharged, the precharging of the SG line is stopped and the storage gate sensing circuitry (e.g., circuit 320) is enabled. The TX_store control signal is then driven high to activate the storage transfer gate 215, which allows charge to be transferred from the photosensor 212 to underneath the storage gate 224 (step 406). At step 408, the method 400 (via detector 330) measures the voltage change at the output of the SG charge sensing circuit 320 to determine the amount of charge collected by the photosensor 212.

Then, it is determined if the voltage change, which is proportional to the charge collected, is greater than a first reference voltage Vsg_ref1 (e.g., 0.8V or 80% of the full well signal) (step 410). If it is determined that the voltage change is greater than the first reference voltage Vsg_ref1, then the integration time flag is set to "11" (step 426). If at step 410 it is determined that the voltage change is not greater than the first reference voltage Vsg_ref1, then it is determined if the voltage change is greater than a second reference voltage Vsg_ref2 (e.g., 0.6V or 60% of the full well signal) (step 412). If it is determined that the voltage change is greater than the second reference voltage Vsg_ref2, then the integration time flag is set to "10" (step 428).

If at step 412 it is determined that the voltage change is not greater than the second reference voltage Vsg_ref2, then it is determined if the voltage change is greater than a third reference voltage Vsg_ref3 (e.g., 0.3V or 30% of the full well signal) (step 414). If it is determined that the voltage change is greater than the third reference voltage Vsg_ref3, then the integration time flag is set to "01" (step 430). If at step 414 it is determined that the voltage change is not greater than the third reference voltage Vsg_ref3, then the integration time flag is set to "00" (step 416).

At step 418, the storage gate 224 is deactivated to move charge back to the photosensor 212. This allows the photosensor 212 to continue integrating charge. At step 420, the TX_store control signal is deactivated to turn off the storage transfer gate 215. The memory voltage Vmem is set based on the integration flag (via multiplexers 342, 340) and the row is reset by activating the reset transistor 216 to write the memory voltage Vmem into the floating diffusion region FD (step 422). At step 424, the reset transistor 216 is turned off, which finalizes the writing of Vmem into the floating diffusion region FD. In addition, the SG_pointer1 selection is turned off at this point.

Figure 11:
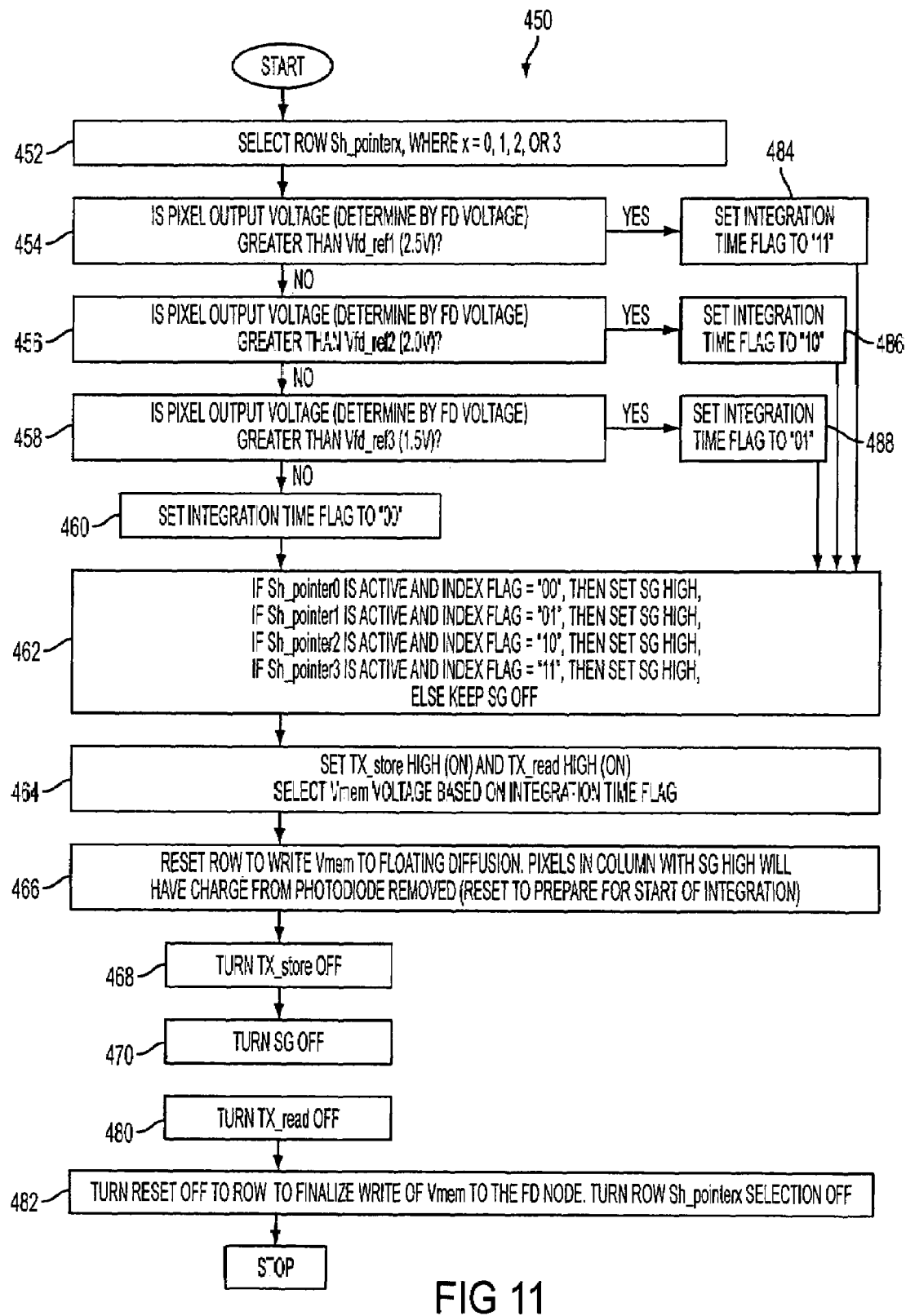
FIG. 11 is a flowchart illustrating a shutter point determining operation.

FIG. 11 is a flowchart illustrating a method 450 comprising the processing performed during a shutter point determining operation. Referring to FIGS. 2, 3 and 10, at step 452, a row is selected using one of the shutter pointers Sh_pointerx, where x is 0, 1, 2 or 3. A determination is then made to see if the pixel output voltage Vout (based on the charge stored at the floating diffusion region FD) is greater than a first reference voltage Vfd_ref1 (e.g., 2.5V)(step 454). If it is determined that the pixel output voltage is greater than the first reference voltage Vfd_ref1, the integration time flag is set to "11" (step 484). If at step 454 it is determined that the pixel output voltage Vout is not greater than the first reference voltage Vfd_ref1, a determination is made to see if the pixel output voltage is greater than a second reference voltage Vfd_ref2 (e.g., 2.0V)(step 456). If it is determined that the pixel output voltage is greater than the second reference voltage Vfd_ref2, the integration time flag is set to "10" (step 486).

If at step 456 it is determined that the pixel output voltage is not greater than the second reference voltage Vfd_ref2, a determination is made to see if the pixel output voltage is greater than a third reference voltage Vfd_ref3 (e.g., 1.5V) (step 458). If it is determined that the pixel output voltage is greater than the third reference voltage Vfd_ref3, the integration time flag is set to "01" (step 488). If at step 458 it is determined that the pixel output voltage is not greater than the third reference voltage Vfd_ref3, the integration time flag is set to "00" (step 460).

At step 462, the SG line is driven high (to turn on the storage gate 224) if Sh_pointer0 is active and the flag is set to "00" or Sh_pointer1 is active and the flag is set to "01" or Sh_pointer2 is active and the flag is set to "01" or Sh_pointer3 is active and the flag is set to "11". Otherwise, the SG line is not driven high. At step 464, the TX_store and TX_read control signals are driven high to activate the two transfer gates 215, 214, respectively. In addition, the memory voltage Vmem is selected based on the integration time flag.

At step 466, the row is reset (via reset transistor 216) to write Vmem into the floating diffusion region FD. Pixels in a column having an activated storage gate 224 (from step 462) will have charge removed from its photosensor 212 (i.e., it has been reset in preparation for the start of integration). Then, the TX_store control signal is deactivated (step 468) to turn off the storage transfer gate 215, the SG line is driven low to turn off the storage gate 224 (step 470) and the TX_read control signal is driven low to turn off the read transfer gate 214 (step 480). At step 482, the reset transistor 216 is turned off to finalize the writing of Vmem into the floating diffusion region and the shutter pointer selection is also turned off (step 482).

Figure 12:
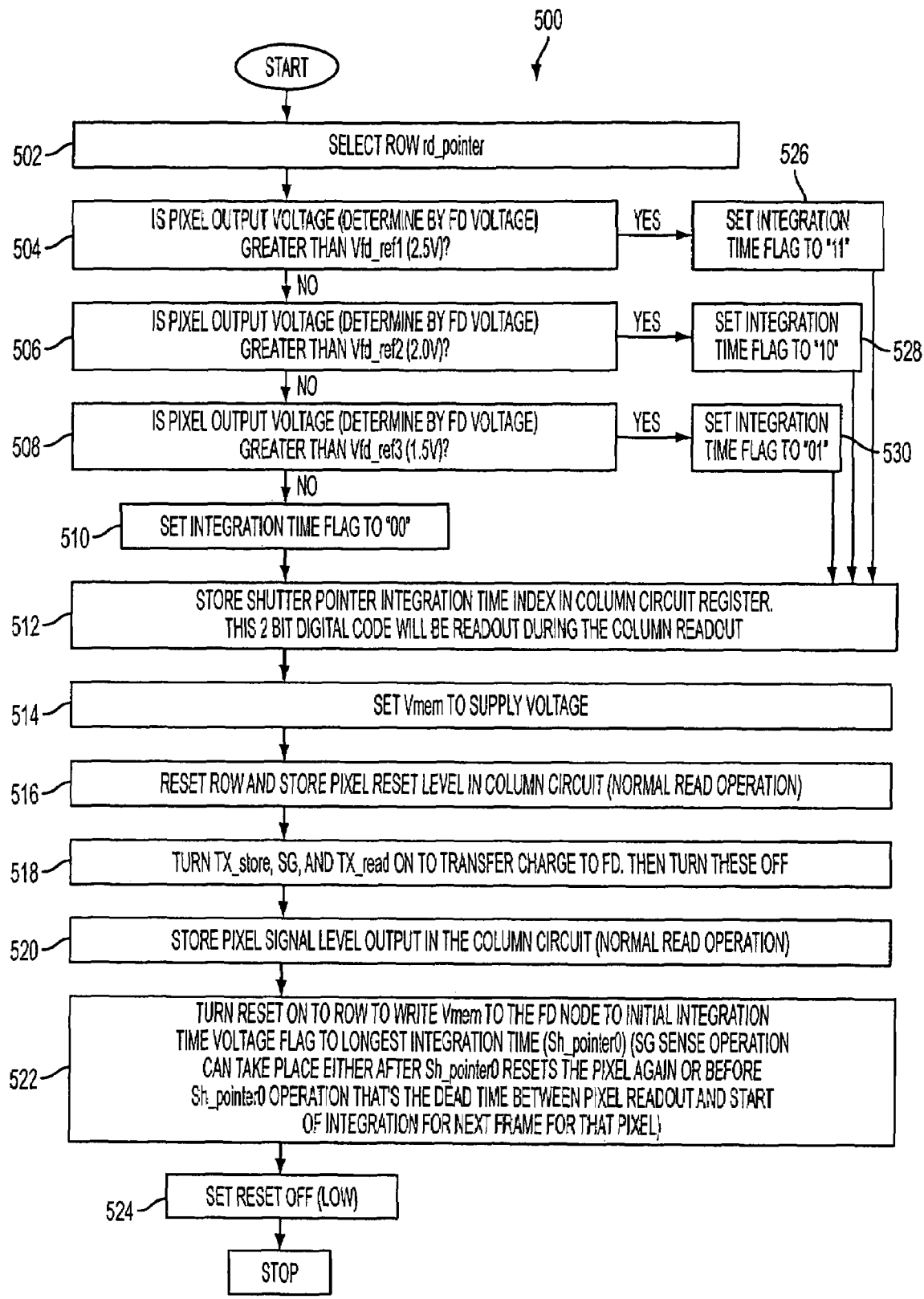
FIG. 12 is a flowchart illustrating a pixel readout operation.

FIG. 12 is a flowchart illustrating a method 500 comprising the processing performed during a pixel readout operation. Initially, a row is selected using the read pointer rd_pointer (step 502). A determination is then made to see if the pixel output voltage Vout (based on the charge stored at the floating diffusion region FD) is greater than a first reference voltage Vfd_ref1 (e.g., 2.5V)(step 504). If it is determined that the pixel output voltage is greater than the first reference voltage Vfd_ref1, the integration time flag is set to "11" (step 526). If at step 504 it is determined that the pixel output voltage is not greater than the first reference voltage Vfd_ref1, a determination is made to see if the pixel output voltage is greater than a second reference voltage Vfd_ref2 (e.g., 2.0V)(step 506). If it is determined that the pixel output voltage is greater than the second reference voltage Vfd_ref2, the integration time flag is set to "10" (step 528).

If at step 506 it is determined that the pixel output voltage is not greater than the second reference voltage Vfd_ref2, a determination is made to see if the pixel output voltage is greater than a third reference voltage Vfd_ref3 (e.g., 1.5V) (step 508). If it is determined that the pixel output voltage is greater than the third reference voltage Vfd_ref3, the integration time flag is set to "01" (step 530). If at step 508 it is determined that the pixel output voltage is not greater than the third reference voltage Vfd_ref3, the integration time flag is set to "00" (step 510).

At step 512, the shutter pointer integration time index is stored in a register in the column circuitry. The 2-bit index will be readout during the column readout operation (below).

At step 514, the memory voltage Vmem is set to the pixel supply voltage (e.g., 2.8V). At step 516, the row is reset (via reset transistor 216) and the pixel's reset level (i.e., Vrst) is stored in the column S/H circuitry 236. Then, the TX_store, SG and TX_read are all driven high to respectively activate transfer gate 215, storage gate 224 and transfer gate 214 (step 518). This allows charge to transfer from the photosensor 212 to the floating diffusion region FD. The pixel signal (Vsig) is then readout into the S/H circuitry 236 (step 520).

At step 522, the reset transistor 216 is activated to write Vmem into the floating diffusion region FD to initialize the integration time voltage to the longest integration time (i.e., Sh_pointer0). The SG sense operation can take place either after the Sh_pointer0 resets the pixel again or before the Sh_pointer0 operation (in the dead time between the pixel readout and the start of the next integration for the next frame). Then, the reset transistor 216 is turned off.

Figure 13:
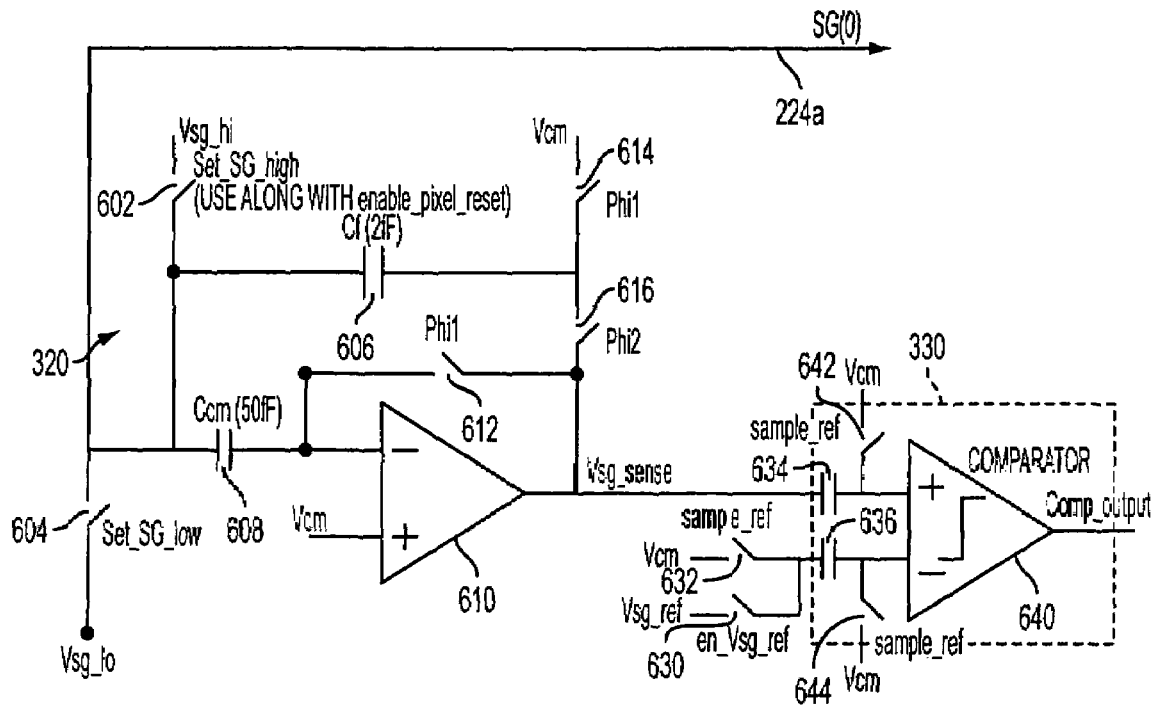
FIG. 13 illustrates storage gate line charge sensing and comparator circuitry.
Figure 14:
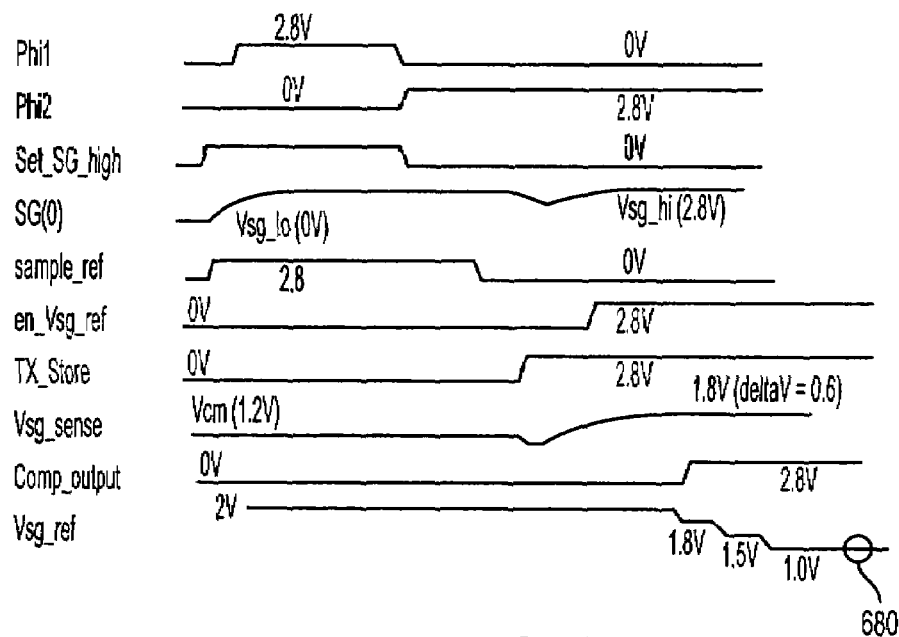
FIG. 14 illustrates a timing diagram for an operation of the FIG. 13 circuitry.

FIG. 13 illustrates storage gate line charge sensing and comparator circuitry used in the FIG. 2 imager 200. FIG. 14 illustrates a timing diagram for an operation of the FIG. 13 circuitry. The circuitry includes the components for the SG line charging and sensing circuit 320 and the SG level detector 330. As discussed above, the SG line charging and sensing circuit 320 drives the SG control signal e.g., SG(0) onto the storage gate control line 224a and can also sense the amount of charge driven out on the line 224a.

The SG line charging and sensing circuit 320 includes switches 602, 604, 612, 614, 616, an input capacitor 608, a feedback capacitor 606, and an amplifier 610. The feedback capacitor 606 when switched across the amplifier 610 determines the gain of circuit 320. The input capacitor 608 at the inverting input of the amplifier 610 decouples DC voltage levels driven out to the storage gate control line 224a and any DC input voltage to ensure that the amplifier 610 works properly. Switch 602 is controlled by the Set_SG_high control signal (which can be used in conjunction with the enable_pixel_reset signal discussed above). Switch 604 is controlled by the Set_SG_low control signal. Switches 612, 614 are controlled by a first clock signal Phi1. Switch 616 is controlled by a second clock signal Phi2. The two signals Phi1, Phi2 may be non overlapping complementary clock signals.

The amplifier 610 output Vsg_sense is input into the SG level detector 330. The SG level detector 330 includes switches 630, 632, 642, 644, capacitors 634, 636 and a comparator 640. Switch 630 is controlled by an enable Vsg reference control signal en_Vsg_ref. When the enable Vsg reference control signal en_Vsg_ref causes switch 630 to close, the SG reference voltage Vsg_ref is connected to capacitor 636. Switch 632 is controlled by a sample reference control signal sample_ref. When the sample reference control signal sample_ref causes switch 632 to close, a common mode voltage Vcm is connected to capacitor 636. The sample reference control signal sample_ref also causes switches 642, 644 to close, which connects the common mode voltage Vcm to a second plate of capacitors 634, 636.

The SG signal SG(0) can be set high or low (without using the amplifier 610) during pixel read or shutter operations. In the timing diagram, the SG signal is set high while amplifier offset is stored on capacitor 608 and the feedback capacitor 606 is reset when the first clock signal Phi1 is high. When the second clock signal Phi2 is applied and the feedback circuit is activated, the offset is stored at the input of the comparator 640. Afterwards, the TX_store control signal is activated; at this point, any charge transferred under the storage gate 224 will pull down on the SG line 224a. The feedback circuit will restore the SG line 224a back up to the high voltage value (Vsg_hi) and the Vsg_sense signal will increase in value depending the amount of sensed charge. FIG. 14 also illustrates the steps of the comparator reference signal Vsg_ref that thresholds how much signal is detected by the circuitry. Point 680 illustrates a point where the comparator output is flipped for small signals that did not trigger an earlier flip (at other Vsg_ref thresholds).

Because of large parasitic capacitance on the SG line 224a relative to a pixel's storage gate 224, the open loop gain of the amplifier 640 must be a few thousand to detect a signal with enough accuracy for the coarse comparisons. The following is an example of the accuracy of the SG line charging and sensing circuit 320:

(1) Average storage gate charge transferred=1,000 electrons (assumes full well is 10,000 electrons);
(2) Parasitic capacitance of the SG line 224a=2 fF*0.1*1600=320 fF+1.7 pF (routing)=2 pF, where 2 fF is the capacitance of the SG gate, 0.1x is the capacitance of the storage gate 224 for rows with TX_store off and the number of pixels in a row (2 Mpixel sensor)=1600;
(3) Feedback capacitance Cf=2 fF; and
(4) Feedback factor=2 fF/2 pF=400->Amp Gain=AB/(1+AB) where B=1/feedback factor, A=amplifier gain.

The voltage at the output of the switched capacitor the SG line charging and sensing circuit 320:

(5) ΔV=Q/C×Amp gain=[(1,000×1.6e-19)/2 fF]*[(2000/400)/(1+2000/400)]=66 mV.

Thus, the SG line charging and sensing circuit's 320 response to 1000 electrons detected is 66 mV. To make the column circuits more robust to comparator errors (depending on how robust the circuit is to noise), having thresholds set, for example, at 150 mV increments may be required. Thus, detecting signal ranges within 3000 electron (192 mV) increments would be possible. This level would need to be taken into consideration when the logic sets the integration time for pixels before the SG sense operation.

Figure 15A:
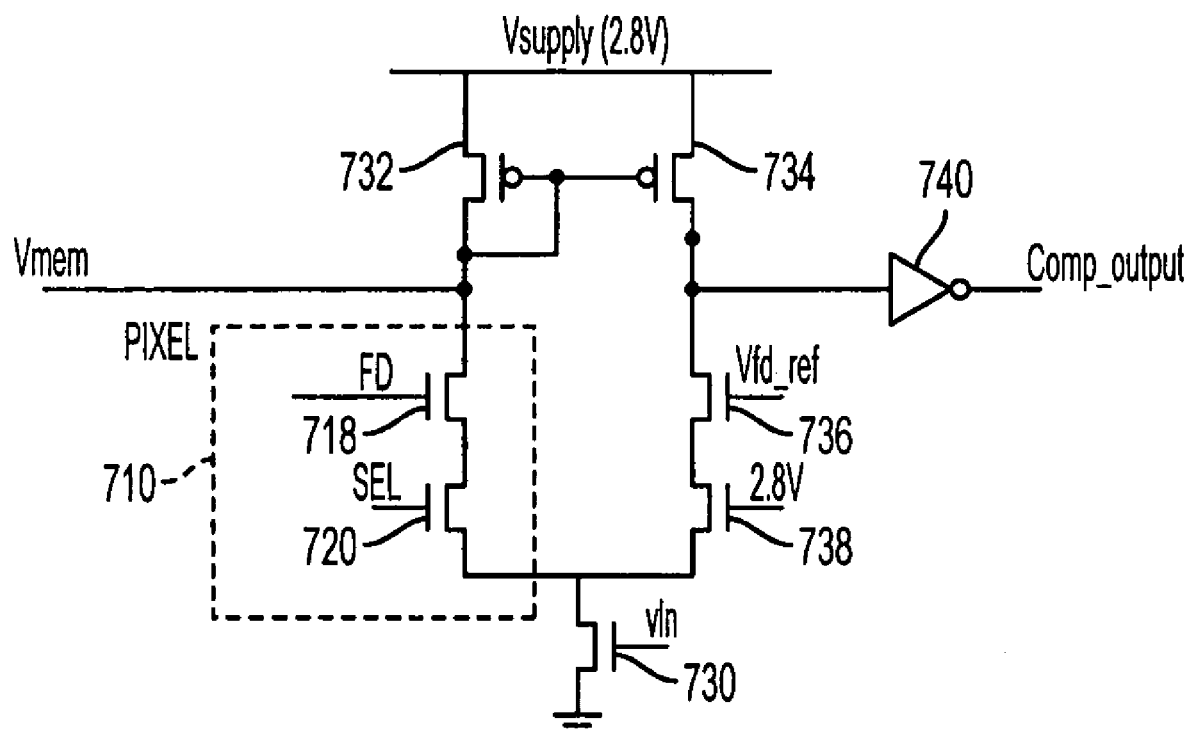
FIG. 15a illustrates a continuous time comparator circuit constructed in accordance with an embodiment of the invention.

FIG. 15a illustrates a continuous time comparator circuit 700 constructed in accordance with an embodiment of the invention. The comparator circuit 700 can be used to determine the floating diffusion voltage flag level and incorporates a pixel circuit 710 (only a portion of the pixel 710 is shown). The effective use of shared circuitry in the illustrated embodiment can also be applied to column circuit to minimize the column circuitry area. The comparator circuit 700 includes two PMOS transistors 732, 734, an inverter 740, three NMOS transistors 730, 736, 738, and the pixel circuit 710. The pixel circuit 710 includes a source follower transistor 718 having its gate connected to a floating diffusion region FD, a row select transistor 720 connected to a row select control signal SEL, and other components (not shown). Transistor 730 serves as a biasing transistor and is activated by a biasing control signal Vln.

Figure 15B:
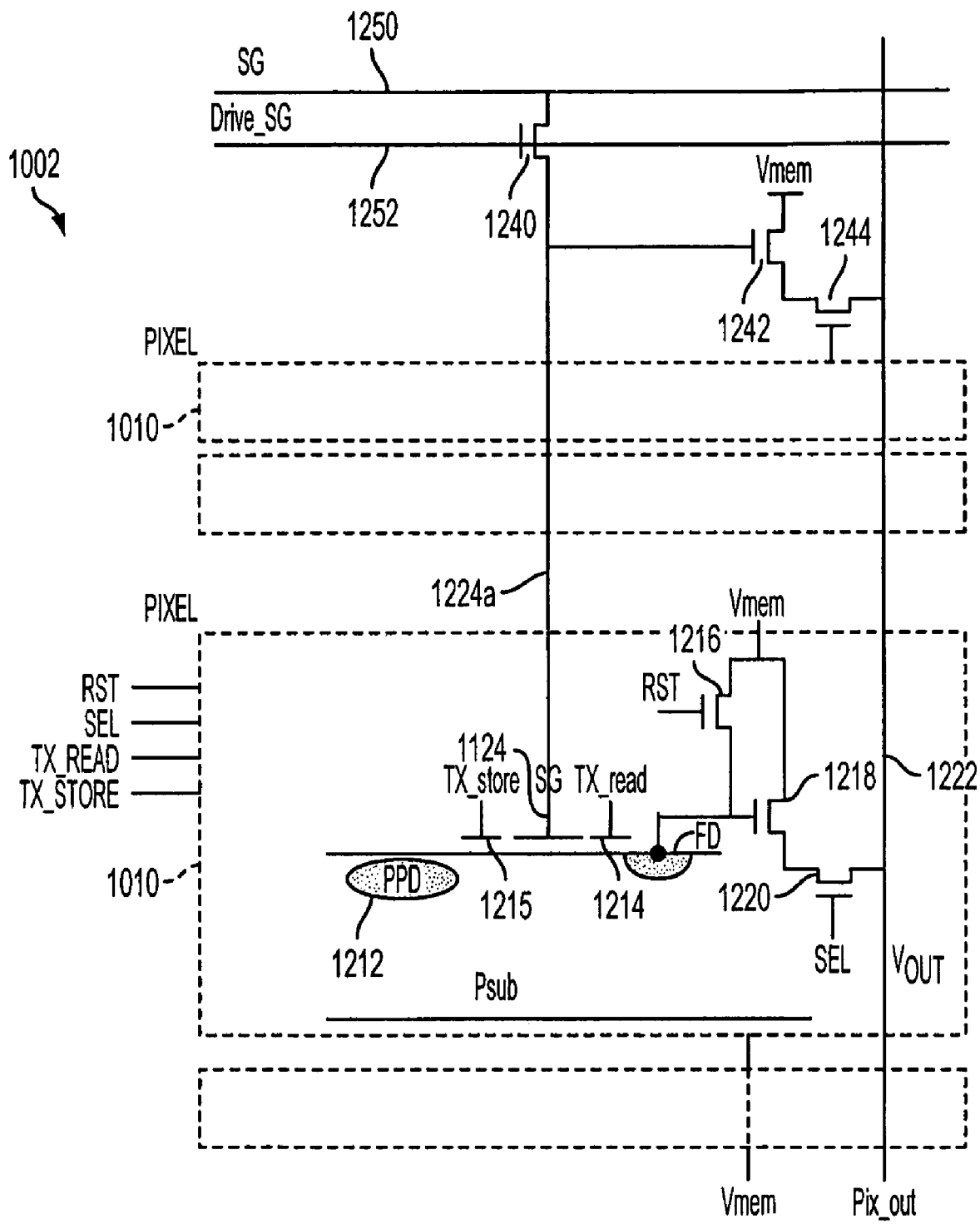
FIG. 15b illustrates a modified pixel circuit constructed in accordance with an embodiment of the invention.

FIG. 15b illustrates a portion of a pixel array 1002 having a modified pixel circuit 1010 used to reduce the impact of the large parasitic capacitance on the SG line 1224a. The capacitance typically impacts the sensitivity of the threshold operation. The pixel circuits 1010 include a photosensor 1212, storage transfer gate 1215, storage gate 1224, read transfer gate 1214, a floating diffusion region FD, reset transistor 1216, source follower transistor 1218, and a row select transistor 1220 connected to a column output line 1222. Additional shared circuitry includes a driving transistor 1240, an SG source follower transistor 1242 and a shared select transistor 1244, which can be connected to the row select lines of the shared pixels 1010 or to a global select line (not shown).

Pixels 1010 in a column share their SG lines 1224a with other pixels 1010 in the column. The shared SG lines 1224a are buffered with the SG source follower transistor 1242. A global SG line 1250 is connected to the shared SG line 1224a via a drive SG line 1252 and transistor 1240 (when activated by the Drive_SG control signal). After the storage gates 1224 are driven high for the set of shared pixels 1010, the SG line 1224a is left floating. The TX_store control signal for the row of interest is activated and charge is sensed under the storage gate 1224 only for that row. By pre-charging the storage gate 1224 to a high enough voltage, the source follower will dominate driving the output line 1222. The resulting signal Vout (also shown as Pix_out) on the output line 1222 is driven into the comparison circuitry in the column. It should be noted that a separate sense amplifier is not required in the column for this operation. After the sense operation, the storage gate 1224 is driven low (i.e., turned off) to put charge back into the photosensor 1212 and under the storage transfer gate 1215. Then, the storage transfer gate 1215 is driven low (in response to the TX_store control signal) to drive the remaining charge into the photosensor 1212.

To perform the individual reset operation for a pixel 1010 and to perform the final pixel readout, the TX_read control signal is driven to a high value and is routed vertically from a column driver. Thus, with this approach the TX_store, SG, and Drive_SG control signals are driven from the row driver (not shown) and the TX_read control signal is driven by the column driver (not shown). In the illustrated embodiment, three extra transistors 1240, 1242, 1244 are used and three rows were chosen to share the SG line 1224a. As such, there is in only one extra transistor per pixel 1010.

Figure 15C:
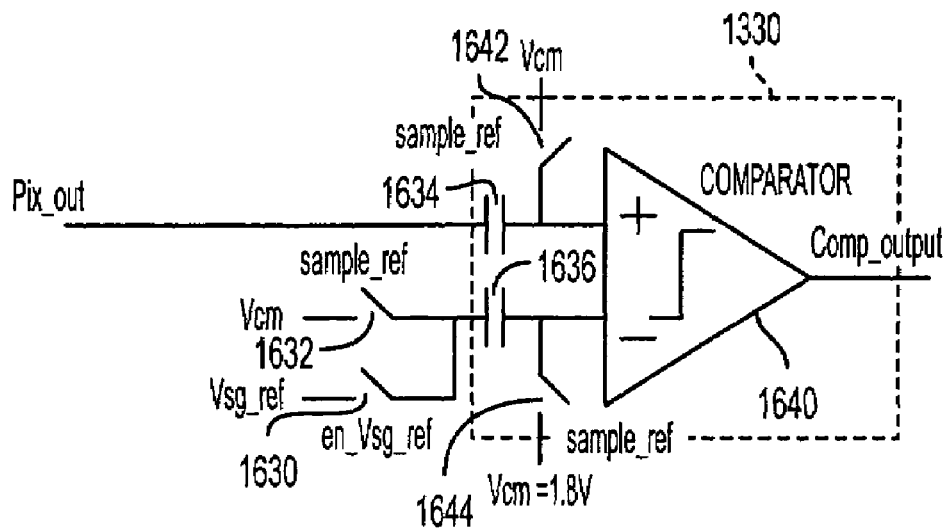
FIG. 15c illustrates a circuit for a buffered storage gate driver with column comparator constructed in accordance with an embodiment of the invention.
Figure 15D:
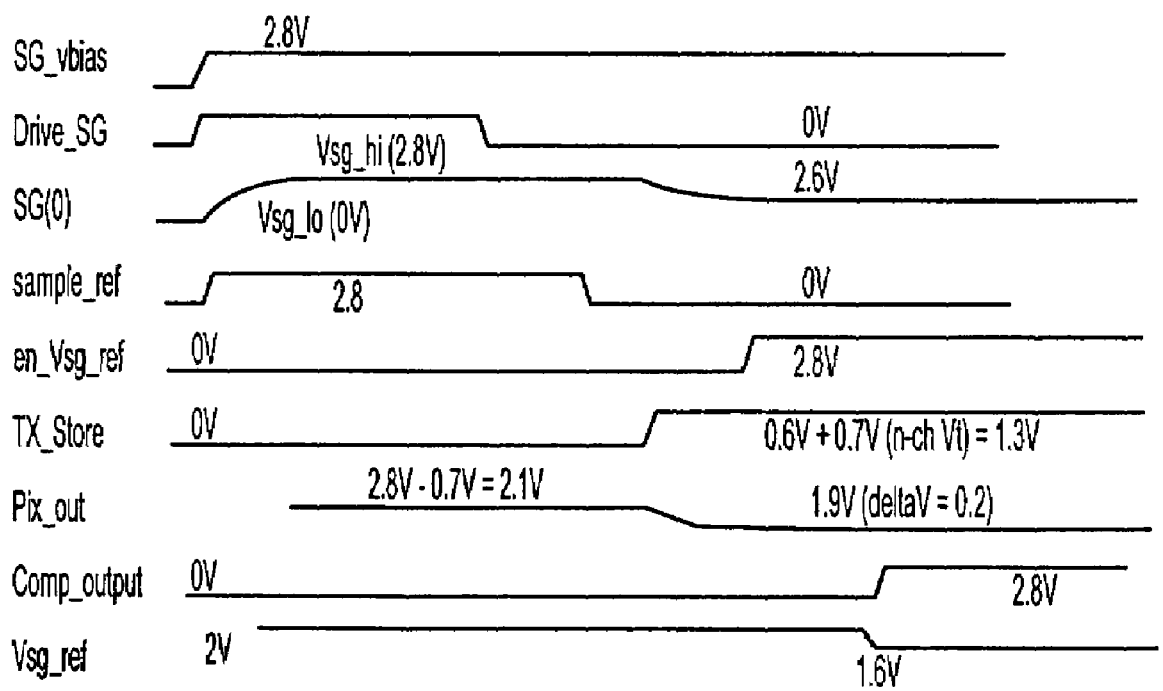
FIG. 15d illustrates a timing diagram for an example operation of the FIG. 15c circuitry.

FIG. 15c illustrates a modified SG line sense and compare circuit 1330 used with the buffered/shared SG line approach illustrated in FIG. 15b. FIG. 15d is a sample timing diagram for the embodiments shown in FIGS. 15b and 15c. Circuit 1330 comprises switches 1630, 1632, 1642, 1644, capacitors 1634, 1636 and a comparator 1640. Switch 1630 is controlled by an enable Vsg reference control signal en_Vsg_ref. When the enable Vsg reference control signal en_Vsg_ref causes switch 1630 to close, the SG reference voltage Vsg_ref is connected to capacitor 1636. Switch 1632 is controlled by a sample reference control signal sample_ref. When the sample reference control signal sample_ref causes switch 1632 to close, a common mode voltage Vcm is connected to capacitor 1636. The sample reference control signal sample_ref also causes switches 1642, 1644 to close, which connects the common mode voltage Vcm to a second plate of capacitors 1634, 1636.

The construction of circuit 1330 is substantially the same as circuit 330 (FIG. 13). One difference is that circuit 1330 is not connected to a sense circuit (e.g., circuit 320 of FIG. 13). Instead, circuit 1330 samples and holds the pixel output signal Pix_out (i.e., Vout) in capacitor 1634. The timing of circuit 1330 is similar to the timing shown in FIG. 14 except that the Drive_SG signal is used to set the SG(0) signal high after a bias SG_vbias is applied to the global SG line 1250 (FIG. 15b) and the pixel output (Pix_out) is compared in the comparator 1640 (instead of Vsg_sense shown in FIG. 14). In the FIG. 15d timing diagram, there is no stepping of the reference voltage Vsg_ref used by the comparator 1640; although there could be stepping of the reference voltage.

Figure 16:
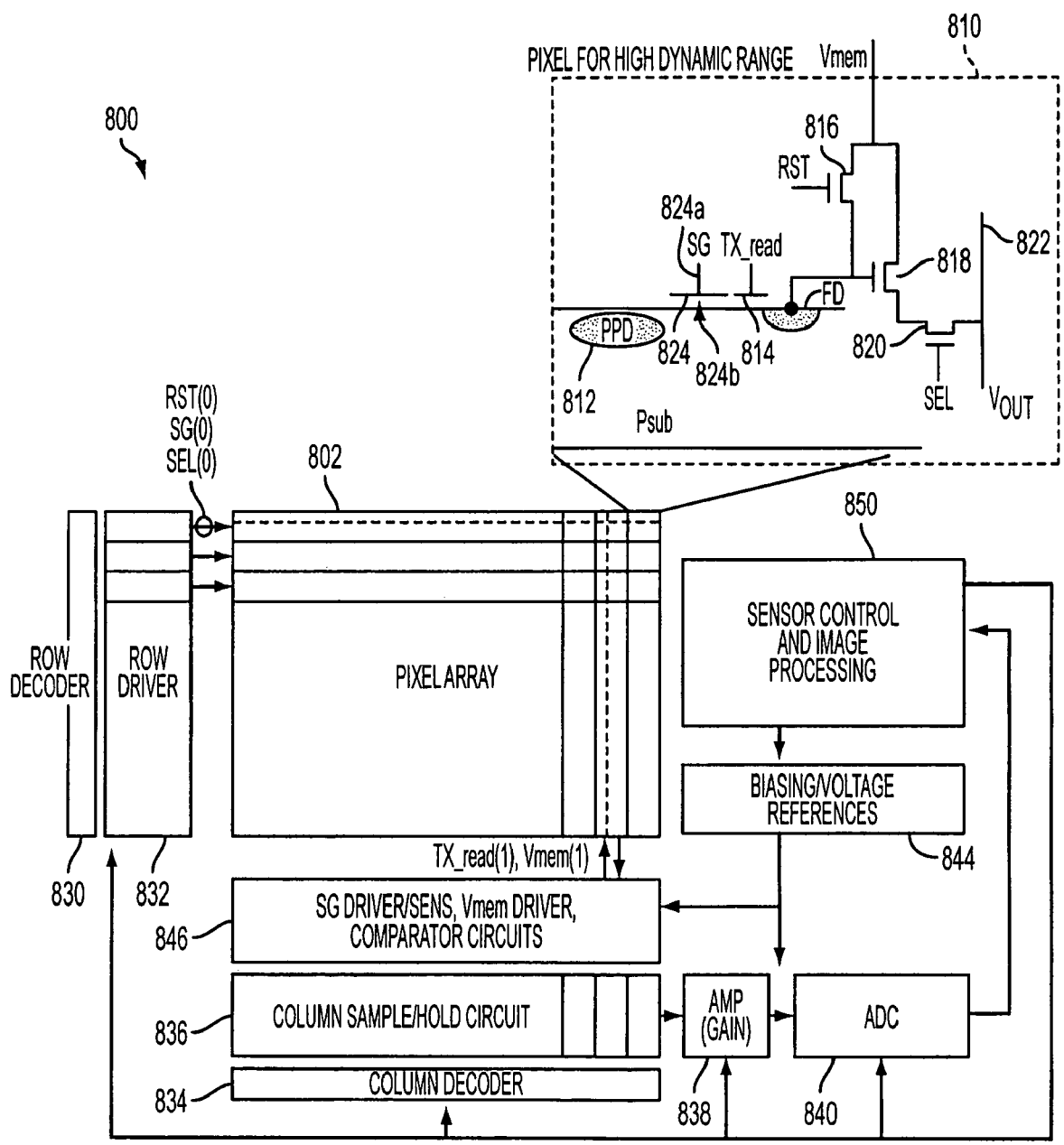
FIG. 16 illustrates a CMOS imager constructed in accordance with another embodiment of the invention.

FIG. 16 illustrates a CMOS imager 800 constructed in accordance with another embodiment of the invention. The illustrated imager 800 includes a pixel array 802 comprising a plurality of pixels 810 arranged in a predetermined number of rows and columns. The outputs Vout of each pixel 810 are connected to column output lines 822, which are connected to column circuitry that includes sensing, driver and comparator circuit 846 and column sample and hold (S/H) circuit 836.

The illustrated pixel 810 contains a pinned photodiode photosensor 812, read transfer gate 814 and a floating diffusion region FD to collect charge transferred from the photosensor 812. Each pixel 810 also includes a reset transistor 816, row select transistor 820 and a source follower output transistor 818. The pixel 810 further includes a storage gate 824 for storing charge in a channel region 824b from the photosensor 812 when a storage gate control signal SG is applied to a storage gate control line 824*a*. As can be seen, the pixel 810 does not require the storage transfer gate used in other embodiments of the invention. Instead, the SG control lines 824*a* and signals SG(0) are routed in the horizontal direction (instead of the vertical direction illustrated in FIG. 2). However, the TX read control line and signal e.g., TX_read(1) are routed in the vertical direction. The illustrated embodiment also does not use an anti-blooming gate, which means that the pixel's 810 configuration is a 4T pixel configuration modified to include a storage gate. As with the other illustrations described above, SG(0), RST(0), SEL(0) indicate SG, RST, SEL signals for a particular row (e.g., row 0). Likewise, TX_read(1), Vmem(1) are used to indicate TX_read and Vmem signals for a particular column (e.g., column 1).

The reset transistor 816 is connected between the floating diffusion region FD and a memory voltage Vmem received from the sensing, driver and comparator circuit 846. A reset control signal RST is used to activate the reset transistor 816, which places the memory voltage Vmem on the floating diffusion region FD. The source follower transistor 818 has its gate connected to the floating diffusion region FD and is connected between the memory voltage Vmem and the row select transistor 820. The source follower transistor 818 converts the charge stored at the floating diffusion region FD into the electrical output voltage signal Vout. The row select transistor 820 is controllable by a row select signal SEL for selectively connecting the source follower transistor 818 and its output voltage signal Vout to the column line 822.

Row lines e.g., SEL(0) connected to the array 802 are selectively activated by row decoder 830 and row driver circuitry 832 in response to an applied row address. Column select lines are selectively activated in response to an applied column address by column circuitry including a column decoder 834.

The CMOS imager 800 is operated by a sensor control and image processing circuit 850, which controls the row and column circuitry for selecting the appropriate row and column lines for pixel readout. Each column is connected to sampling capacitors and switches in S/H circuitry 836. A pixel reset signal Vrst and a pixel image signal Vsig for selected pixels are sample and held by the S/H circuitry 836. A differential signal (Vrst-Vsig) is produced for each pixel by the differential amplifier 838, which applies a gain to the signal received from the S/H circuitry 836. The differential signal is digitized by an analog-to-digital converter 840 (ADC). The analog-to-digital converter 840 supplies the digitized pixel signals to the sensor control and image processing circuit 850, which among other things, forms a digital image output. The imager 800 also contains biasing/voltage reference circuitry 844.

Figure 17A:
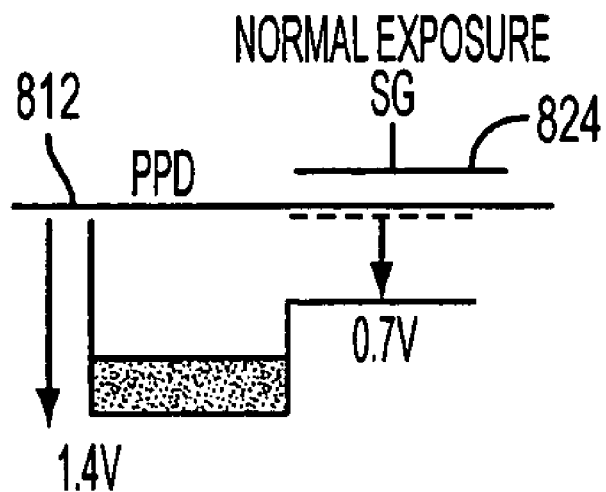
FIGS. 17A-17B illustrate potential diagrams for operations of the FIG. 16 imager.
Figure 17B:
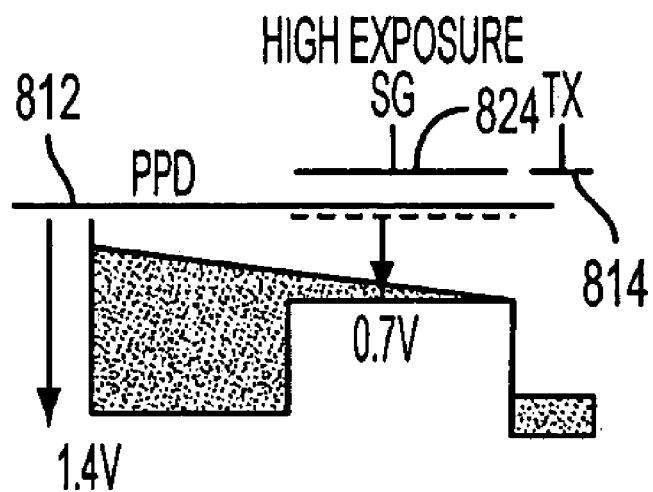

FIGS. 17A and 17B illustrate potential diagrams for operations of the FIG. 16 imager 800. In operation, the voltage applied to the storage gate 824 is raised partially to allow some charge to transfer from the photosensor 812 when there is a high exposure to light. The barrier for charge transfer is low enough for pixels with a large amount of collected charge to be sensed under the transfer gate 814 (FIG. 17*b*), but not enough to allow transfer of charge under normal to light exposure levels (FIG. 17*a*). The read transfer gate 814 is set high by the driver portion of the sensing, driver and comparator circuit 846. The transfer gate 814 then senses the stored charge when the voltage controlling the storage gate 824 is partially raised high. It should be appreciated that the charge may be sensed by the source follower 818 as well depending in how sensitive each pixel circuit 810 is designed.

Because the sense operation is destructive and charge after the sense operation is corrupted by noise from the floating diffusion region FD, the storage gate 824 is pulsed high only partially to allow only highly illuminated pixel signals to be sampled by the sense circuit within the sensing, driver and comparator circuit 846. Because these pixels 810 get a shorter integration time and are reset again later, corruption of the sampled signal does not have any adverse consequences.

Figure 18:
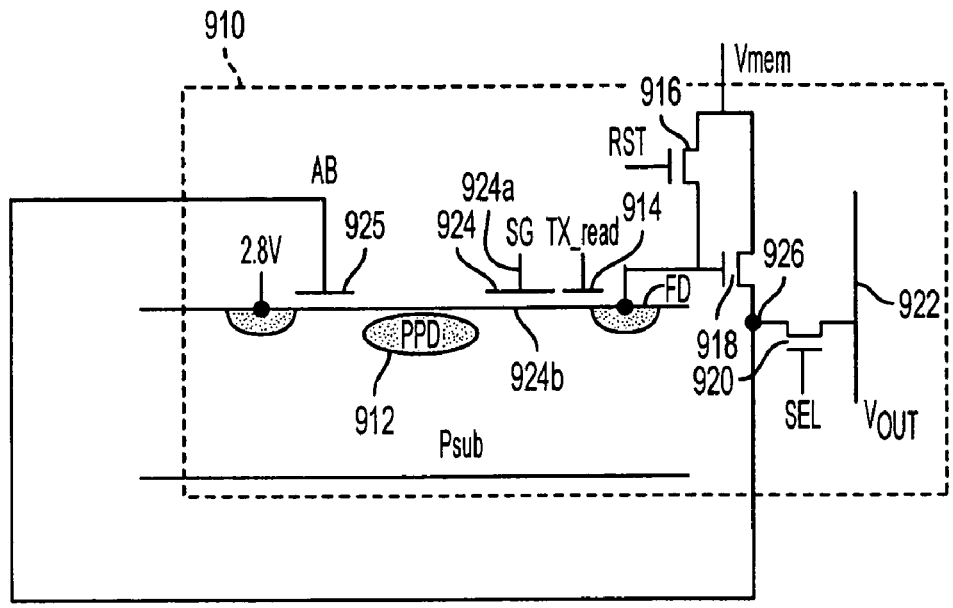
FIG. 18 illustrates an alternative pixel configuration in accordance with an embodiment of the invention.

FIG. 18 illustrates an alternative configuration for a pixel 910 that can be utilized in the invention. In the prior embodiments, the imager operation has been described as using a rolling shutter. FIG. 18 illustrates an embodiment of a pixel 910 that achieves high dynamic range while also allowing for a global shutter operation. The pixel 910 includes a pinned photodiode photosensor 912, read transfer gate 914, a floating diffusion region FD to collect charge transferred from the photosensor 912, a reset transistor 916, row select transistor 920, source follower output transistor 918, a storage gate 924 for storing charge in a channel region 924*b* when the storage gate control signal SG is applied to the storage gate control line 924*a* and an anti-blooming gate 925.

By adding the anti-blooming gate 925 and connecting it to the node 926 between the source follower transistor 918 output and the row select transistor 920 drain, all pixels 910 with a targeted integration time (as set by the floating diffusion flag voltage Vmem) are initialized to integrate at the same time. In operation, node 962 is set high (e.g. 2V) at the start of image array reset through the anti-blooming gate 925 by turning on all row selects in the array and connecting the column output line to a high voltage (e.g. 2V). Vmem is also driven to the same high voltage (e.g. 2V). In operation, node 926 is set low (e.g., 0V) at the start of integration to turn off the photosensor 912 reset through the anti-blooming gate 925 by driving the column output line to 0V while all rows are still selected. After this step, all row selects are turned off. Then, to put individual pixels in reset (until the shutter operation enables start of integration) and using the voltage on the floating diffusion region FD (e.g. a high voltage to flag pixels with a shorter integration time) to control the gate of the source follower transistor 918, Vmem is stepped from a low voltage (e.g., 0V) to a higher voltage to connect the anti-blooming gate 925 to a higher voltage for those pixels with a high voltage on the floating diffusion region FD. During this operation the anti-blooming gate 925 is driven to approximately an n channel gate threshold drop (e.g. 0.8V) below the voltage on the floating diffusion when Vmem is stepped to the higher voltage.

The shutter operation then enables start of integration for the individual pixels just reset by turning on all rows in the array and connecting the column output line to a low voltage (e.g., 0V). Vmem is also held at the low voltage (e.g., 0V). Pixels already integrating see no change because their anti-blooming gates 925 are at ground. However, those pixels with their anti-blooming gates 925 pulled high to Vmem will now have their anti-blooming gates 925 connected to ground to start integration. Global charge transfer for all pixels stops integration i.e., typical global shutter operation. This method enables performing a global shutter operation for pixels with an option either one of two different integration times.

Figure 19:
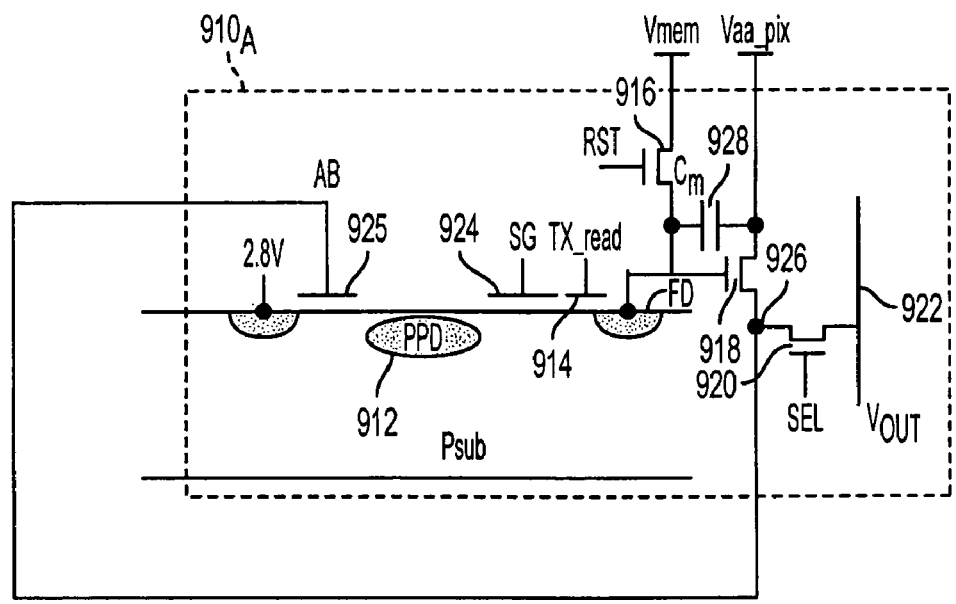
FIG. 19 illustrates another alternative pixel configuration in accordance with an embodiment of the invention.

FIG. 19 illustrates an alternative configuration for a pixel 910*a* that can be utilized in the invention. The pixel 910*a* also achieves high dynamic range while allowing for a global shutter operation and is similar to the pixel 910 illustrated in FIG. 18. Pixel 910*a*, however, adds a capacitor 928 between the floating diffusion region FD and the source follower supply voltage Vaa_pix. This capacitor 928 allows for the setting of more than two different integration times as is explained below.

The memory voltage Vmem written to the floating diffusion region FD through the reset transistor 916 is used to flag the integration time. The memory voltage Vmem, however, is set to 2.8V during normal pixel readout. The capacitor 928 couples the voltage on the floating diffusion region (Vfd) to the array supply voltage Vaa_pix in order to shift the source follower transistor's 918 output voltage when it sets the anti-blooming gate 925 high (i.e., activates the transistor 925). The array supply voltage Vaa_pix is stepped during integration to set the gate of the source follower transistor 918 high enough to pull up the anti-blooming gate 925 to prevent targeted individual pixels from integrating. This method is used to achieve multiple integration times when the floating diffusion voltage Vfd is set to different voltages.

Node 926 is set low (e.g., less than the n channel threshold voltage for the anti-blooming gate 925) at the start of integration to turn off the photosensor reset through the anti-blooming gate 925. Then, to put individual pixels in reset (until the shutter operation enables start of integration) and using the floating diffusion voltage Vfd coupled to the array supply voltage Vaa_pix through capacitor 928 to control the gate of the source follower transistor 918, the floating diffusion voltage Vfd is stepped from a low voltage (e.g., less then source follower transistor 918 threshold voltage plus anti-blooming gate 925 threshold voltage) to a higher voltage (e.g., greater than the source follower transistor 918 threshold voltage plus anti-blooming gate 925 threshold voltage) to drive the anti-blooming gate 925 to a high enough voltage for the photosensor 912 reset (determined by the threshold voltage of the anti-blooming gate 925 and the pinned photodiode voltage of the photosensor 912).

The shutter operation enables the starting of integration by turning on all rows in the array and connecting the column output line to a low voltage. The array supply voltage Vaa-pix is set lower to force the source follower transistor 918 to turn off and allow the anti-blooming gate 925 to be driven to a lower voltage. Pixels already integrating see no change because their anti-blooming gate 925 is at ground. However, those pixels with the anti-blooming gate 925 pulled high to the memory voltage Vmem will now have their anti-blooming gate 925 connected to ground to start integration. The array supply voltage Vaa_pix is subsequently pulled to a higher voltage, which turns on the source follower transistor 918 for only those pixels set for a shorter integration time. This process is repeated for each available integration time. Global charge transfer for all pixels stops integration as with typical global shutter operation. This method enables performing a global shutter operation for pixels with an option either of one or more different integration times.

Figure 20:
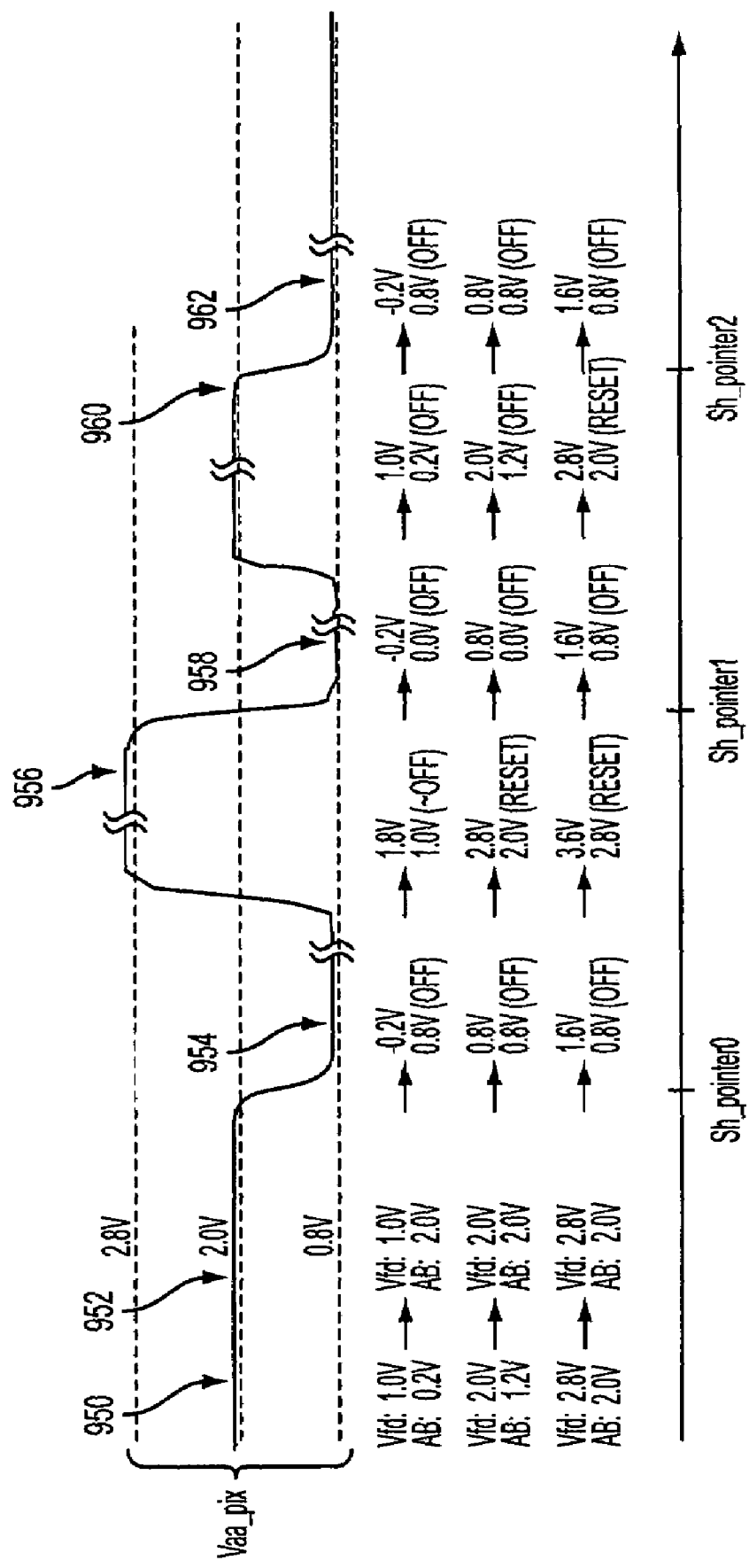
FIG. 20 illustrates a timing diagram for a simultaneous reset of pixels and multiple integration times.

FIG. 20 illustrates a sample timing diagram for controlling the array supply voltage Vaa_pix and the resulting sample voltage levels on the floating diffusion region FD/anti-blooming (AB) transistors 925 to initialize pixel integration.

Arrow 950 illustrates the floating diffusion region voltage Vfd during the floating diffusion write operation. Arrow 952 illustrates the time frame when the pixel output line is forced to 2.0V and all rows are selected to force AB to 2.0V. At this time, all photosensors are reset. Arrow 954 illustrates the time frame when the pixel output line is forced to 0.8V and all rows are selected to force AB to 0.8V (the anti-blooming gate is off). This starts the integration period for the frame.

Arrow 956 illustrates the resetting of the pixels with the floating diffusion voltage flag initially set at 2.0V or 2.8V. Those flagged with 1.0V are allowed to continue their integration. Arrow 958 illustrates the time frame when the pixel output line is forced to 0.8V and all rows are selected to force AB to 0.8V (i.e., the anti-blooming gate is off). Arrow 960 illustrates the resetting of pixels with the floating diffusion voltage flag initially set at 2.8V. Those pixels flagged with 2.0V or 1.0V are allowed to continue their integration. Arrow 962 illustrates all pixels integrating for the remaining integration time.

The global shutter operation with high dynamic range works only for snap shots because of the need to do the sense operation in a rolling shutter fashion. Because the sense operation uses the floating diffusion region FD to store information about the exposure, the next image frame capture cannot start until all rows of the existing frame are readout. However, if the sensor is used in rolling shutter mode to initially setup the sense operation and store the floating diffusion flags while the video frame is readout, then a still shot can be captured in a global snap shot mode.

In general, this technique is applicable to shared pixel structures. However, rather than controlling individual pixels, it is expected that this technique would be applied to groups of pixels sharing the same floating diffusion region FD. Added logic would possibly be needed to determine which pixel in the shared structure would set the optimum exposure time.

Figure 21:
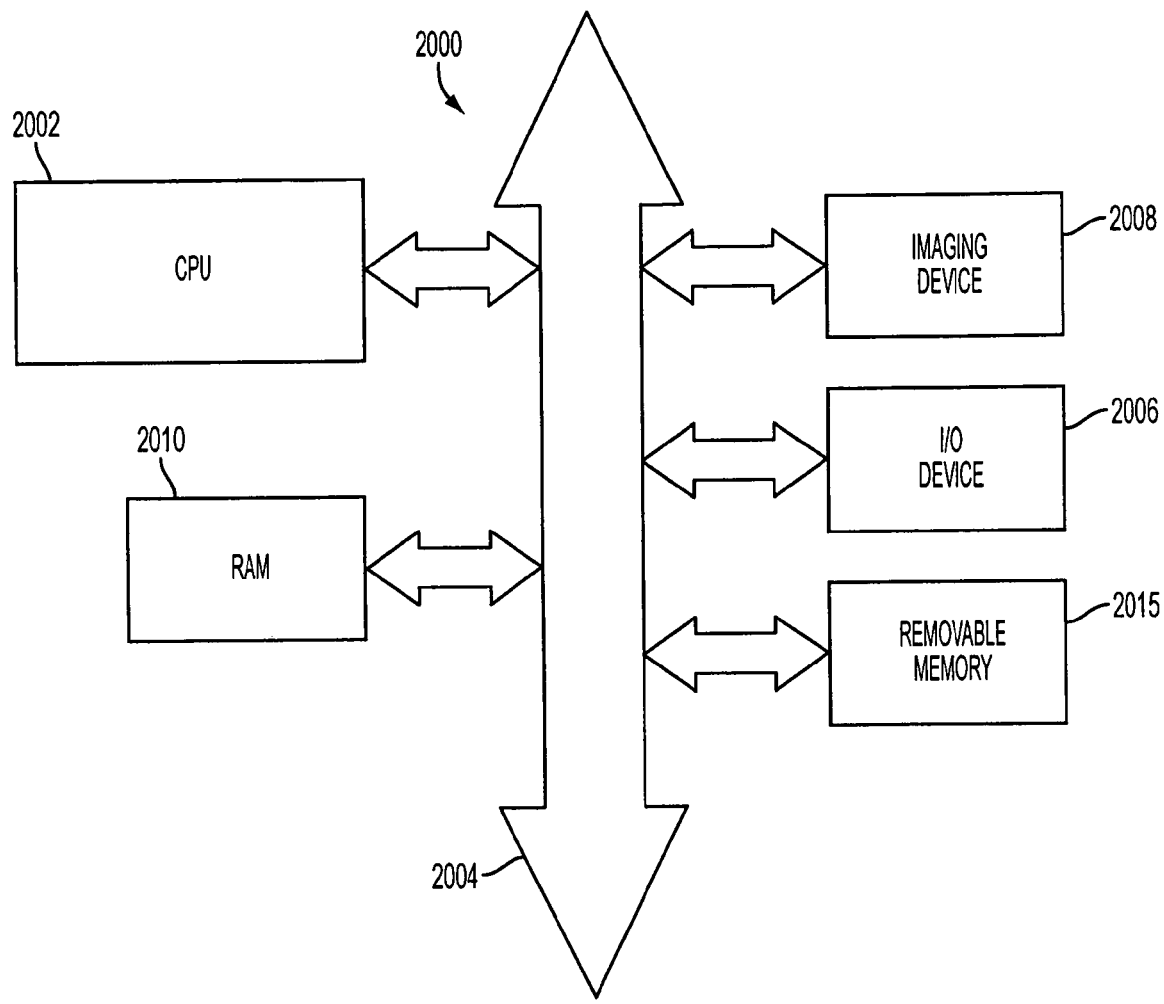
FIG. 21 illustrates a system suitable for use with any one of the embodiments of the invention.

FIG. 21 shows system 2000, a typical processor system modified to include an imaging device 2008 constructed in accordance with one of the embodiments of the invention. The system 2000 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

System 2000, for example a camera system, generally comprises a central processing unit (CPU) 2002, such as a microprocessor, that communicates with an input/output (I/O) device 2006 over a bus 2004. Imaging device 2008 also communicates with the CPU 2002 over the bus 2004. The system 2000 also includes random access memory (RAM) 2010, and can include removable memory 2015, such as flash memory, which also communicate with the CPU 2002 over the bus 2004. The imaging device 2008 may be combined with a processor, such as a CPU, digital signal processor, or microprocessor, with or without memory storage on a single integrated circuit or on a different chip than the processor. The imaging device 2008 may be any one of the imagers 200, 800 constructed in accordance with the invention.

The major tradeoff with adding the functionality of the invention is the use of additional column circuitry. A column amplifier is required to perform the non-destructive read operation, a comparator is required to detect the floating diffusion voltage to determine when to apply the appropriate shutter operation, and a latch is required to store the floating diffusion information during pixel readout. There is a small amount of logic in the column to help control these circuits. However, the operations do not require high precision matching or accuracy and thus, it is expected that the additional column circuitry will not require as much space or power as other typical high precision column parallel circuits.

The processes and devices described above illustrate preferred methods and typical devices of many that could be used and produced. The above description and drawings illustrate embodiments, which achieve the objects, features, and advantages of the present invention. However, it is not intended that embodiments of the present invention be strictly limited to the above-described and illustrated embodiments. Any modification, though presently unforeseeable, that comes within the spirit and scope of the following claims should be considered part of the present invention.

What is claimed as new and desired to be protected by Letters Patent of the United States is:

1. An imaging device comprising:
 a plurality of pixels, each pixel comprising a photosensor, a first gate for storing charge from the photosensor when activated by a first control signal during a sampling period, a floating diffusion region for storing charge transferred from the photosensor after an integration period, and a second gate connected to receive a voltage flag and output the voltage flag to the floating diffusion region in response to a second control signal; and
 a plurality of sense circuits, each sense circuit being connected to and associated with a column of pixels, each sense circuit generating the first control signal during the sampling period for a selected pixel in its respective column and sensing an amount of charge stored under the first gate of the selected pixel, each sense circuit having an output connected the second gate of the selected pixel and outputting the voltage flag which is representative of the sensed charge to the second gate, wherein the pixel stores the voltage flag in its floating diffusion region during the sampling period to set an integration time for the selected pixel.

2. The imaging device of claim 1, wherein the sense circuit comprises:
a sensing portion for sensing the charge stored under the first gate and outputting the sensed charge as a first output;
a first comparator portion for comparing the first output to at least one predetermined threshold and having a second output corresponding to an amount of the sensed charged; and
a flag setting portion for setting a value of the voltage flag based on the second output from the first comparator portion.

3. The imaging device of claim 2, wherein the first comparator portion compares the first output to at least three predetermined thresholds and the flag setting portion sets the voltage flag to one of four values based on the second output.

4. The imaging device of claim 1, wherein the sense circuit sets at least one shutter pointer used to readout pixel signals after the integration period.

5. The imaging device of claim 1, wherein the sense circuit sets a first shutter pointer used to reset pixels to start the integration period and a second shutter pointer used to readout pixel signals after the integration period, the first shutter pointer being based on the sensed charge.

6. The imaging device of claim 1, wherein the sense circuit precharges a line connected to the first gate of each selected pixel in its column before performing the sampling operation.

7. The imaging device of claim 1, wherein charged transferred under the first gate is pushed back to the photosensor after the sampling period.

8. The imaging device of claim 1, wherein the first gate is a transfer gate used to collect charge during the sampling period and transfer charge from the photosensor after the integration period.

9. The imaging device of claim 1, wherein each sense circuit senses the charge under the selected pixel more than one time prior to the integration period.

10. The imaging device of claim 1, wherein the pixels share a sensing line with other pixels in a same column and the device further comprises a second circuit for buffering the sensing line.

11. The imaging device of claim 1, wherein the first gate is a transfer gate and the first control signal is a transfer gate control signal, and wherein the first control signal is driven from column circuitry.

12. An imaging device comprising:
a plurality of pixels, each pixel comprising a photosensor, a first gate for storing charge from the photosensor when activated by a first control signal during a sampling period, a second gate for draining charge away from the photosensor, a floating diffusion region for storing charge transferred from the photosensor after an integration period, and an output transistor having a gate terminal connected to the floating diffusion region, an output terminal of the output transistor being connected to control the second gate; and
a plurality of sense circuits, each sense circuit being connected to and associated with a column of pixels, each sense circuit generating the first control signal during the sampling period for a selected pixel in its respective column and sensing an amount of charge stored under the first gate of the selected pixel, each sense circuit outputting to the pixel a voltage flag representative of the sensed charged,
wherein the pixel stores the voltage flag in its floating diffusion region during the sampling period to set an integration time for the selected pixel.

13. The imaging device of claim 12, wherein each pixel further comprises a capacitive element connected between a reset transistor connected to the floating diffusion region and another terminal of the output transistor, the capacitive element providing the device with multiple potential integration times.

14. The imaging device of claim 12, wherein the device is operated using a global shutter.

15. An imaging device comprising:
a plurality of pixels, each pixel comprising a photosensor, a first gate for storing charge from the photosensor when activated by a first control signal during a sampling period, a floating diffusion region for storing charge transferred from the photosensor after an integration period, a second gate for transferring charge from the photosensor to the first gate when activated by a second control signal, a third gate connected to receive a voltage flag and output the voltage flag to the floating diffusion region in response to a third control signal; and
a plurality of sense circuits, each sense circuit being connected to and associated with a column of pixels, each sense circuit generating the first control signal during the sampling period for a selected pixel in its respective column and sensing an amount of charge stored under the first gate of the selected pixel, each sense circuit generating and outputting the voltage flag representative of the sensed charge.

16. The imaging device of claim 15, wherein the pixel stores the voltage flag in its floating diffusion region during the sampling period to set an integration time for the selected pixel.

17. The imaging device of claim 15, wherein each pixel further comprises a fourth gate for transferring charge received from the photosensor through the first gate to the floating diffusion region.

18. The imaging device of claim 17, wherein the first gate is a storage gate transistor, the second gate is a first transfer transistor, the third gate is a reset transistor and the fourth gate is a second transfer transistor.

* * * * *